(12) United States Patent
Ha

(10) Patent No.: US 11,392,161 B2
(45) Date of Patent: Jul. 19, 2022

(54) JOINT AND KNOB ASSEMBLY AND APPLIANCE HAVING JOINT AND KNOB ASSEMBLY

(71) Applicant: LG ELECTRONICS INC., Seoul (KR)

(72) Inventor: Yeonsik Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 16/911,896

(22) Filed: Jun. 25, 2020

(65) Prior Publication Data

US 2020/0326744 A1 Oct. 15, 2020

Related U.S. Application Data

(63) Continuation of application No. 15/899,637, filed on Feb. 20, 2018, now Pat. No. 10,732,665.

(30) Foreign Application Priority Data

Jul. 26, 2017 (KR) .................. 10-2017-0094806

(51) Int. Cl.
*F24C 3/12* (2006.01)
*G05G 1/12* (2006.01)
(Continued)

(52) U.S. Cl.
CPC .............. *G05G 1/12* (2013.01); *F16L 29/007* (2013.01); *F23N 1/007* (2013.01); *F24C 3/008* (2013.01);
(Continued)

(58) Field of Classification Search
CPC .... Y10T 408/665; Y10S 464/905; F16D 3/06; F16D 3/26; F16D 3/2057; F16D 3/46; F16C 3/03; F16C 3/035
See application file for complete search history.

(56) References Cited

U.S. PATENT DOCUMENTS 98,885 A * 1/1870 Roberts .................... F16D 3/38
464/119
113,455 A 4/1871 Scrannage et al.
(Continued)

FOREIGN PATENT DOCUMENTS

CN 103069227 4/2013
CN 105757133 A * 7/2016
(Continued)

OTHER PUBLICATIONS

European Search Report dated Jan. 25, 2021 issued in EP Application No. 20201469.2.
(Continued)

*Primary Examiner* — Jorge A Pereiro
(74) *Attorney, Agent, or Firm* — KED & Associates LLP

(57) ABSTRACT

A joint, a knob assembly, and an appliance having a joint and a knob assembly are provided. The joint may include a housing, a first shaft support, a second shaft support, and a coupling shaft. A slot having a predetermined width extending in a circumferential direction of the housing and a predetermined length extending in a longitudinal direction of the housing may be formed in the housing. The coupling shaft provided in the second support may include a rotary shaft rotatably inserted into the slot. A stopper may be formed to protrude from an outside of the rotary shaft, and a position of the stopper inside the slot may be changed according to rotation of the rotating shaft. The stopper may be provided in the slot so that the stopper interferes with an inner wall of the housing formed by the slot at a predetermined position.

20 Claims, 14 Drawing Sheets

(51) Int. Cl.
*F24C 3/00* (2006.01)
*F23N 1/00* (2006.01)
*F16L 29/00* (2006.01)
*G05G 1/08* (2006.01)
*F23N 5/18* (2006.01)
*F24C 3/02* (2021.01)
*G05G 5/05* (2006.01)

(52) U.S. Cl.
CPC ............ *F24C 3/126* (2013.01); *G05G 1/08* (2013.01); *F23N 2005/185* (2013.01); *F23N 2235/12* (2020.01); *F23N 2235/24* (2020.01); *F23N 2241/08* (2020.01); *F24C 3/027* (2013.01); *G05G 5/05* (2013.01)

(56) References Cited

U.S. PATENT DOCUMENTS

| | | | |
|---|---|---|---|
| 577,992 A | 3/1897 | Switzer | |
| 636,758 A * | 11/1899 | Casaday | F16D 3/32 |
| | | | 464/114 |
| 676,118 A | 6/1901 | Billings | |
| 956,912 A * | 5/1910 | Walters | F16D 3/2052 |
| | | | 464/115 |
| 1,358,467 A * | 11/1920 | Robertson | F16D 3/2052 |
| | | | 464/159 |
| 1,491,186 A * | 4/1924 | Bartlett | F16D 3/34 |
| | | | 464/115 |
| 1,553,312 A * | 9/1925 | Garrecht | F16D 3/2052 |
| | | | 464/115 |
| 1,604,699 A * | 10/1926 | La Croix | F16D 3/207 |
| | | | 464/115 |
| 1,689,955 A * | 10/1928 | Meacham | F24C 3/12 |
| | | | 126/39 J |
| 1,898,265 A * | 2/1933 | Ragan | F16D 3/32 |
| | | | 464/114 |
| 1,947,965 A * | 2/1934 | Beggs | F16D 1/06 |
| | | | 464/115 |
| 1,981,084 A * | 11/1934 | Teller | F24C 15/12 |
| | | | 126/39 N |
| 2,147,141 A * | 2/1939 | Blancha | F16D 3/2052 |
| | | | 464/115 |
| 2,174,342 A * | 9/1939 | Greulich | F16D 3/12 |
| | | | 464/39 |
| 2,288,425 A * | 6/1942 | Simborg | F16D 3/2052 |
| | | | 464/33 |
| 2,539,840 A * | 1/1951 | Jones | F24C 3/124 |
| | | | 126/39 B |
| 2,626,661 A | 1/1953 | McDowell | |
| 2,631,704 A | 3/1953 | De Wiess | |
| 2,658,979 A | 11/1953 | Jungholm | |
| 2,667,768 A * | 2/1954 | Winkler | F16D 3/72 |
| | | | 464/70 |
| 2,708,888 A * | 5/1955 | Varney | A63H 19/18 |
| | | | 105/99 |
| 2,738,758 A | 3/1956 | Cutler et al. | |
| 2,832,409 A | 4/1958 | Lee et al. | |
| 2,837,154 A | 6/1958 | Harper et al. | |
| 2,865,594 A | 12/1958 | Winfree | |
| 2,895,314 A * | 7/1959 | Helm | F16D 3/20 |
| | | | 464/153 |
| 2,899,808 A * | 8/1959 | Berens | F16D 3/06 |
| | | | 464/73 |
| 2,945,364 A * | 7/1960 | Marquis | F16D 3/2052 |
| | | | 464/116 |
| 2,983,119 A * | 5/1961 | Glover | F16D 3/2052 |
| | | | 464/116 |
| 3,212,290 A * | 10/1965 | Walden | F16D 3/38 |
| | | | 464/88 |
| 3,304,001 A | 2/1967 | Forte | |
| 3,528,263 A | 9/1970 | Stern | |
| 3,572,055 A * | 3/1971 | Billey | F16D 3/74 |
| | | | 464/88 |
| 3,595,273 A | 7/1971 | Kolodziej | |
| 3,609,994 A * | 10/1971 | Colletti et al. | F16D 3/2052 |
| | | | 464/9 |
| 3,621,158 A | 11/1971 | Swinstead | |
| 3,844,137 A | 10/1974 | Zugel | |
| 3,858,129 A | 12/1974 | Ashida et al. | |
| 4,065,941 A * | 1/1978 | Aoki | F16D 3/207 |
| | | | 464/115 |
| 4,092,871 A * | 6/1978 | Cunningham | F16H 21/20 |
| | | | 74/40 |
| 4,449,955 A | 5/1984 | Watanabe et al. | |
| 4,540,383 A | 9/1985 | Taig | |
| 4,692,127 A * | 9/1987 | Wagner | F16D 3/06 |
| | | | 464/119 |
| 4,868,530 A | 9/1989 | Ahs | |
| 4,964,840 A * | 10/1990 | Kapaan | F16D 3/42 |
| | | | 464/125 |
| 5,284,455 A | 2/1994 | Kuribayashi | |
| 5,436,413 A | 7/1995 | Katakami | |
| 5,458,028 A * | 10/1995 | Cleveland, III | B25B 23/0014 |
| | | | 464/119 |
| 5,665,946 A | 9/1997 | Nishijima et al. | |
| 5,693,245 A | 12/1997 | Clizbe | |
| 6,031,439 A | 2/2000 | Adams et al. | |
| 6,325,724 B1 * | 12/2001 | Sato | F16D 3/40 |
| | | | 464/114 |
| 6,621,016 B2 | 9/2003 | Ohba et al. | |
| 6,627,828 B1 * | 9/2003 | McCartney | F24C 3/124 |
| | | | 200/61.86 |
| 7,171,727 B2 | 2/2007 | Wylie et al. | |
| 7,479,607 B2 | 1/2009 | Sack et al. | |
| 8,079,287 B2 | 12/2011 | Castillo | |
| 8,783,646 B2 | 7/2014 | Wasser | |
| 8,997,591 B1 | 4/2015 | Vircks | |
| 9,593,855 B2 | 3/2017 | Moro et al. | |
| 9,646,783 B1 | 5/2017 | Stoufer et al. | |
| 10,248,153 B2 | 4/2019 | Stoufer et al. | |
| 10,288,065 B1 * | 5/2019 | Smid | F04C 2/1073 |
| 10,466,736 B2 | 11/2019 | Stoufer | |
| 10,746,409 B2 | 8/2020 | Ha | |
| 2004/0070574 A1 | 4/2004 | Wylie et al. | |
| 2007/0181410 A1 | 8/2007 | Baier | |
| 2008/0053806 A1 | 3/2008 | Stoffers et al. | |
| 2008/0121067 A1 | 5/2008 | Uhlin | |
| 2009/0263186 A1 | 10/2009 | Hofmann | |
| 2009/0293654 A1 | 12/2009 | Pintauro | |
| 2010/0043499 A1 | 2/2010 | Choi et al. | |
| 2010/0265176 A1 | 10/2010 | Olsson et al. | |
| 2011/0005508 A1 | 1/2011 | Albizuri | |
| 2012/0115096 A1 | 5/2012 | Gadini et al. | |
| 2012/0204854 A1 | 8/2012 | Dondurur et al. | |
| 2012/0215475 A1 | 8/2012 | Rutledge et al. | |
| 2013/0137526 A1 | 5/2013 | Sugiyama | |
| 2014/0260775 A1 | 9/2014 | Freeman et al. | |
| 2015/0005081 A1 * | 1/2015 | Harnetiaux | F16D 3/06 |
| | | | 464/162 |
| 2015/0122134 A1 | 5/2015 | Moro et al. | |
| 2015/0153047 A1 | 6/2015 | Moro et al. | |
| 2015/0153048 A1 | 6/2015 | Moro et al. | |
| 2016/0053803 A1 * | 2/2016 | Yu | F16D 3/38 |
| | | | 403/57 |
| 2016/0097541 A1 | 4/2016 | Choi | |
| 2016/0170436 A1 | 6/2016 | Farrar et al. | |
| 2016/0265786 A1 | 9/2016 | Choi | |
| 2016/0333990 A1 | 11/2016 | Edinger et al. | |
| 2016/0333991 A1 | 11/2016 | Edinger et al. | |
| 2017/0083039 A1 | 3/2017 | Wuisan et al. | |
| 2017/0235326 A1 | 8/2017 | Koschinat | |
| 2017/0351292 A1 | 12/2017 | Stoufer et al. | |
| 2018/0210484 A1 | 7/2018 | Stoufer | |
| 2018/0239386 A1 | 8/2018 | Ha | |
| 2018/0259996 A1 | 9/2018 | Stoufer et al. | |
| 2019/0024903 A1 | 1/2019 | Ha | |

(56) References Cited

U.S. PATENT DOCUMENTS

| | | |
|---|---|---|
| 2019/0101949 A1 | 4/2019 | Takizawa et al. |
| 2019/0170360 A1 | 6/2019 | Ha et al. |

FOREIGN PATENT DOCUMENTS

| | | | |
|---|---|---|---|
| DE | 10-2005-045300 | 9/2006 | |
| DE | 10-2007-035564 | 1/2009 | |
| EP | 0 412 041 | 2/1991 | |
| EP | 0 584 400 | 3/1994 | |
| EP | 1420181 A1 * | 5/2004 | ........... F16D 3/2052 |
| EP | 1881514 | 1/2008 | |
| EP | 1 962 167 | 8/2008 | |
| EP | 2 088 357 | 8/2009 | |
| EP | 2 587 161 | 5/2013 | |
| EP | 2 703 671 | 3/2014 | |
| EP | 3 492 815 | 6/2019 | |
| EP | 3493721 | 6/2019 | |
| GB | 322884 | 12/1929 | |
| GB | 2 081 874 | 2/1982 | |
| GB | 2 178 134 | 2/1987 | |
| GB | 3940378 | 6/1990 | |
| JP | S 5660922 | 5/1981 | |
| JP | S56-77793 | 6/1981 | |
| JP | S 5761860 | 4/1982 | |
| JP | 60065909 | 4/1985 | |
| JP | 60249729 | 12/1985 | |
| JP | H 01-136723 | 9/1989 | |
| JP | 2716246 | 2/1998 | |
| JP | H10-258694 | 9/1998 | |
| JP | H 11-000140 | 11/1999 | |
| JP | 2006-118539 | 5/2006 | |
| JP | 2012-003588 | 1/2012 | |
| JP | 2015-190560 | 11/2015 | |
| JP | 2016-217593 | 12/2016 | |
| JP | 2017-157397 | 9/2017 | |
| KR | 20-1989-0013720 | 8/1989 | |
| KR | 10-1994-0026468 | 12/1994 | |
| KR | 10-2018-0021844 | 6/1998 | |
| KR | 1998-0020482 | 7/1998 | |
| KR | 20-1998-0052401 | 10/1998 | |
| KR | 1998-0052401 | 10/1998 | |
| KR | 10-0175848 | 3/1999 | |
| KR | 10-1999-0031371 | 5/1999 | |
| KR | 10-2000-0008085 | 2/2000 | |
| KR | 20-2000-0006636 | 4/2000 | |
| KR | 20-0181156 | 5/2000 | |
| KR | 20-0193805 | 8/2000 | |
| KR | 10-2003-0047508 | 6/2003 | |
| KR | 102 55 676 | 6/2004 | |
| KR | 10-2005-0104447 | 11/2005 | |
| KR | 10-2006-0035373 | 4/2006 | |
| KR | 10-0646087 | 11/2006 | |
| KR | 10-2007-0064981 | 6/2007 | |
| KR | 10-2007-0077412 | 7/2007 | |
| KR | 10-0854156 | 8/2008 | |
| KR | 10-0941463 | 2/2010 | |
| KR | 10-1140121 | 4/2012 | |
| KR | 10-2012-0140490 | 12/2012 | |
| KR | 10-2015-0128172 | 11/2015 | |
| WO | WO 2010/134040 | 11/2010 | |
| WO | WO 2013/175438 | 11/2013 | |
| WO | WO 2013/175441 | 11/2013 | |
| WO | WO 2015/008092 | 1/2015 | |
| WO | WO 2015/171503 | 11/2015 | |

OTHER PUBLICATIONS

European Search Report dated Jan. 25, 2021 issued in EP Application No. 20201473.4.
European Search Report dated Jan. 26, 2021 issued in EP Application No. 20201471.8.
U.S. Notice of Allowance dated Sep. 9, 2020 issued in U.S. Appl. No. 15/899,583.
Korean Office Action dated May 26, 2021 issued in KR Application No. 10-2021-0048242.
Korean Notice of Allowance dated Aug. 13, 2021 issued in KR Application No. 10-2021-0048242.
European Search Report dated Jun. 7, 2021 issued in Application No. 20201468.4.
European Search Report dated Jul. 18, 2018 issued in Application No. 18157319.7.
European Search Report dated Jul. 18, 2018 issued in Application No. 18157431.0.
European Search Report dated Jul. 19, 2018 issued in Application No. 18157306.4.
European Search Report dated Jul. 19, 2018 issued in Application No. 18157312.2.
Korean Notice of Allowance dated Jul. 20, 2018 issued in Application No. 10-2017-0023774.
European Search Report dated Oct. 10, 2018 issued in Application No. 18157383.3.
European Search Report dated Nov. 27, 2018 issued in Application No. 18157306.4.
European Office Action dated Aug. 5, 2019.
Korean Office Action dated Aug. 20, 2019.
U.S. Office Action dated Aug. 21, 2019 issued in co-pending U.S. Appl. No. 15/899,797.
U.S. Office Action dated Dec. 11, 2019 issued in co-pending U.S. Appl. No. 15/899,637.
Korean Notice of Allowance dated Jan. 13, 2020 issued in Application No. 10-2017-0093734.
Korean Notice of Allowance dated Jan. 13, 2020 issued in Application No. 10-2017-0167073.
Korean Office Action dated Jan. 21, 2020 issued in Application No. 10-2017-0094806.
United States Office Action dated Jan. 24, 2020 issued in co-pending related U.S. Appl. No. 15/899,730.
European Search Report dated Feb. 24, 2020 issued in Application No. 19209191.6.
Chinese Office Action dated Mar. 4, 2020 issued in Application No. 201811486621.X.
U.S. Notice of Allowance dated Mar. 23, 2020 issued in co-pending U.S. Appl. No. 15/899,637.
Korean Office Action dated Apr. 9, 2020 issued in Application No. 10-2018-0136829.
Korean Office Action dated Apr. 26, 2020 issued in KR Application No. 10-2018-0152988.
U.S. Office Action dated Jun. 5, 2026 issued in U.S. Appl. No. 15/899,507.
Korean Office Action dated Jul. 29, 2020 issued in KR Application No. 10-2017-0094806.
Korean Office Action dated Oct. 17, 2020 issued in KR Application No. 10-2018-0136829.
Korean Office Action dated Oct. 17, 2020 issued in KR Application No. 10-2018-0152988.
U.S. Appl. No. 17/118,882, filed Dec. 11, 2020.
U.S. Appl. No. 16/911,896, filed Jun. 25, 2020.
U.S. Appl. No. 16/986,942, filed Aug. 6, 2020.
U.S. Appl. No. 16/923,566, filed Jul. 8, 2020.
Korean Notice of Allowance dated Jan. 13, 2021 issued in Application No. 10-2020-0045531.
Korean Office Action dated Mar. 9, 2021 issued in Application No. 10-2021-0008599.
Korean Notice of Allowance dated Apr. 5, 2021 issued in Application No. 10-2020-0048575.
Korean Notice of Allowance dated Sep. 28, 2021.
Korean Notice of Allowance dated Apr. 14, 2022 issued in Application No. 10-2017-0167071.

* cited by examiner (RELATED ART)

(RELATED ART)

JOINT AND KNOB ASSEMBLY AND APPLIANCE HAVING JOINT AND KNOB ASSEMBLY

CROSS-REFERENCE TO RELATED APPLICATIONS

This application is a Continuation Application of prior U.S. patent application Ser. No. 15/899,637 filed on Feb. 20, 2018, which claims priority under 35 U.S.C. § 119 to Korean Application No. 10-2017-0094806 filed on Jul. 26, 2017, whose entire disclosures are hereby incorporated by reference.

BACKGROUND

1. Field

A joint and a knob assembly and an appliance having a joint and knob assembly are disclosed herein.

2. Background

Cooking appliances are appliances that cook food or other items (hereinafter "food"), and may be installed or provided in a kitchen space. Such cooking appliances may be classified in various ways according to, for example, heat sources used therein, forms or shapes thereof, and types of fuel. Cooking appliances may be classified as an open-type and/or a closed-type according to a form of space in which food is placed. Closed-type cooking appliances may include an oven or a microwave, for example, and open-type cooking appliances may include a cooktop or a hob, for example.

Closed-type cooking appliances may be cooking appliances in which a space in which food may be placed is sealed, and the sealed space may be heated to cook food. Open-type cooking appliances may be cooking appliances in which food or a container filled with food may be placed in an open space, and the food or the food container may be heated to cook the food.

A cooking compartment, which may be a space sealed when food is placed therein, may be provided in closed-type cooking appliances. Such a cooking compartment may be a space in which food may be cooked. A heat source may be provided inside or outside the cooking compartment to heat the cooking compartment.

Complex cooking appliances, in which a closed-type cooking appliance and an open-type cooking appliance may be installed and a plurality of heat sources may be combined so that various foods may be cooked and a plurality of foods may be simultaneously cooked, have been proposed. In a complex cooking appliance, an open-type cooking appliance may be provided above a closed-type cooking appliance. A plurality of heaters or burners may be installed in the open-type cooking appliance to allow a plurality of foods or dishes to be cooked simultaneously.

A user may use a closed-type cooking appliance when barbecuing, baking, or roasting meat or fish, for example, and may use an open-type cooking appliance when cooking by heating a container filled with food. Open-type cooking appliances may be a gas stove, which is an appliance that cooks food using flames generated when gas is burned.

There may be various methods in which a user may adjust an intensity of the flames. Among the various methods, a method in which a heating power is adjusted using a knob that is rotated about a predetermined rotary shaft and adjusting a rotational amount of the knob may be used. Such a knob may also be connected to a valve configured to mechanically control a flow amount of gas to adjust an opening amount of the valve. A method, in which a rotational amount of a knob may be electronically measured and an opening amount of a valve may be electronically controlled based on a measured result, may also be applied to such a knob.

In the structure in which a knob mechanically adjusts the opening amount of a valve, the knob and the valve may be connected with or to a rotary shaft, and a rotary force of the knob may be transmitted to the valve via the rotary shaft to adjust the opening amount of the valve. The knob may be installed to be rotatable about the rotary shaft, but its appearance may be degraded due to a size error in a manufacturing process or an assembly deviation in an assembly process and a failure in operation of the knob may also be caused.

One of the reasons for the above phenomenon is that a rotary shaft may not be properly aligned. That is, for a knob to be accurately aligned at a regular position, a rotary shaft connecting the knob and a valve should be correspondingly aligned, and a deviation may occur between an angle at which the valve and the rotary shaft are connected and an angle at which the knob and the rotary shaft are connected due to a size error in the manufacturing process or an assembly deviation in the assembly process. Because of this, the knob may be installed at or in a deviated position.

As one of methods for solving the above problem, a method of using a tool to absorb or fix the deviation between the angle at which the valve and the rotary shaft are connected and the angle at which the knob and the rotary shaft are connected may be used. A joint may be an example of such a tool. A joint, which may be a power transmission device, may be used to transmit power from a drive member or drive to a drive member when the driving member and the driven member are not aligned and are bent at a predetermined angle from each other.

Referring to FIG. 1, a joint may include two pairs of yokes 3 and 3' having shafts 1 and 1' that protrude from upper and lower surfaces and outer surfaces formed to be opposite each other in or on a cylindrical curved surface, a connector 5 which serves as a spider provided in a space between the yokes 3 and 3', and a rivet 7 configured to pass through the pairs of yokes 3 and 3' opposite each other and the connector 5 to connect the pair of yokes 3 and 3' and the connector 5. The joint having the above structure may be widely used in which power of a power generation device may have to be transmitted to another member, for example, in a power transmission device of a vehicle, a drive device of a machine, and power transmissions of electrically-driven and manually-driven tools.

However, such a joint may have disadvantages in that weight and cost may be high due to being manufactured with a metal material with high strength to withstand a high load, an angle of connection between the yokes 3 and 3' may have to be manually adjusted, and an additional task for fixing the adjusted angle of connection may be necessary. When the above-described commercial joint is applied to a cooking appliance, weight and manufacturing costs of a product may be increased, assembling ability may be degraded, and a problem in which a knob may be misaligned due to the joint may occur when the angle of connection between the yokes 3 and 3' is not accurately adjusted.

BRIEF DESCRIPTION OF THE DRAWINGS

The embodiments will be described in detail with reference to the following drawings in which like reference numerals refer to like elements wherein.

DETAILED DESCRIPTION

Figure 1:
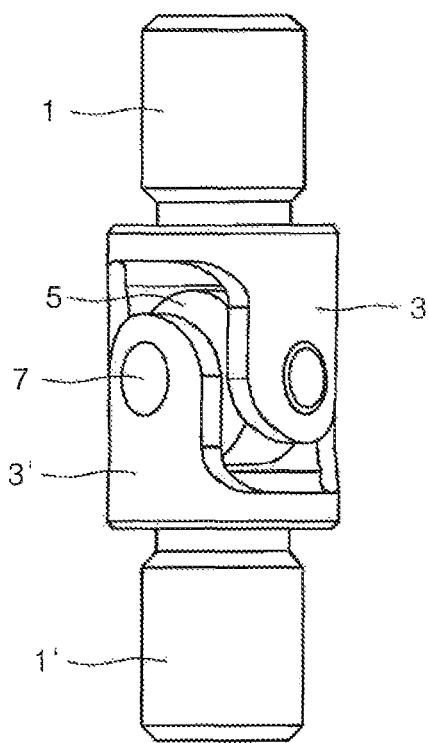
FIG. 1 is a view showing a structure of a related art joint.
Figure 2:
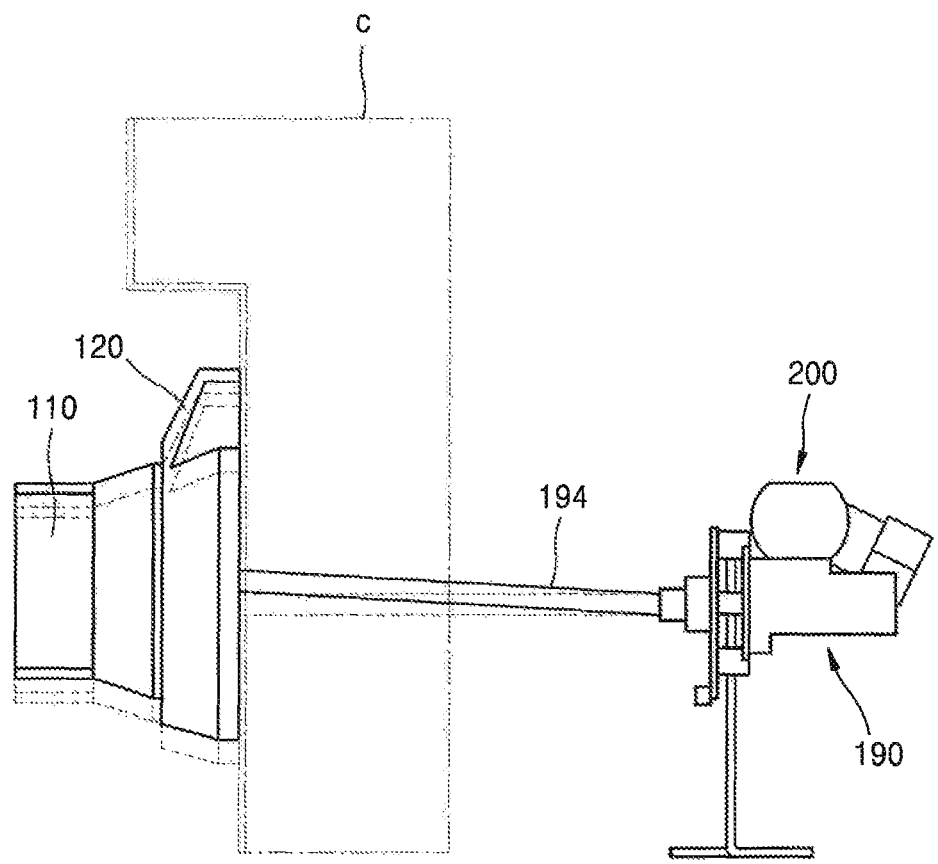
FIG. 2 is a view of a knob assembly of a related art cooking appliance.

Referring to FIG. 2, a burner and a knob assembly of an appliance may include a valve assembly 190 configured to adjust a supply amount of gas, and the valve assembly 190 may be operated by a knob 110 provided at or on a front surface of a front panel c to adjust an amount of gas supplied to the burner. The valve assembly 190 and the knob 110 may be connected by an adjusting shaft 194 installed to connect between the valve assembly 190 and the knob 110. When the knob 110 is rotated while the valve assembly 190 and the knob 110 are connected to each other, a rotary force thereof may be transmitted to the valve assembly 190 through the adjusting shaft 194 so that the valve assembly 190 may be manipulated. By manipulation of the valve assembly 190, an opening amount of a valve may be adjusted. For example, a structure in which an opening amount of a valve may be changed to adjust a heating power of a burner may be provided.

The knob 110 and a knob ring 120 configured to surround the knob 110 in an annular shape may be provided at or outside the front panel c. The knob 110 may be installed to be rotatable in a horizontal direction, and the adjusting shaft 194 may be coupled to the knob 110 to be rotatable by interlocking with rotation of the knob 110. The adjusting shaft 194 having one axial side coupled to the knob 110 may be rotated by interlocking with rotation of the knob 110, and a rotary force transmitted through such an adjusting shaft 194 may power for manipulation of the valve assembly 190.

The valve assembly 190 may be manufactured, for example, by welding a cast. In manufacturing the valve assembly 190, the adjusting shaft 194 may have a position tolerance. Such a tolerance of the adjusting shaft 194 may cause a deviation in position of the knob 110 assembled to the adjusting shaft 194. The position deviation of the knob 110 may increase as a length of the adjusting shaft 194 becomes larger. That is, the tolerance of the adjusting shaft 194 may be directly related to an assembly tolerance of the knob 110 and the knob ring 120 assembled to the adjusting shaft 194. Referring to FIG. 2, accurate or non-deviated assembly positions of the knob 110 and the knob ring 120 are marked by dotted lines. However, when the tolerance of the adjusting shaft 194 occurs, the assembly positions of the knob 110 and the knob ring 120 may be changed, as marked by the solid lines.

A plurality of burners may be provided in a single cooking appliance. In such a case, the knob 110 and the knob ring 120 connected to each valve may be provided with predetermined alignment. However, when tolerance occurs in each adjusting shaft 194, the knob 110 and the knob ring 120 may be misaligned, and an exterior appearance or quality may be degraded. The tolerance of the adjusting shaft 194 may cause an operation failure as well as a defect in the exterior. Due to misalignment of the adjusting shaft 194, if rotating the knob 110 is not smoothly performed, the knob 110 may become stuck and may not return to its original position.

To solve the above-described problems, the knob 110 and the knob ring 120 may be assembled at positions so that an exterior appearance of a cooking appliance may be improved, and an operation failure of the knob 110 may be reduced.

Hereinafter, elements of a knob assembly according to an embodiment are described. A structure of a knob assembly provided in a cooking appliance, which is one kind of appliance, is described as an example. However, the embodiments are not limited to a cooking appliance and may be applied to various other types of appliances having a burner. For example, other than a cooking appliance, the embodiments may be applied to any one of various types of appliances having a burner, such as a heater and a dryer.

Figure 3:
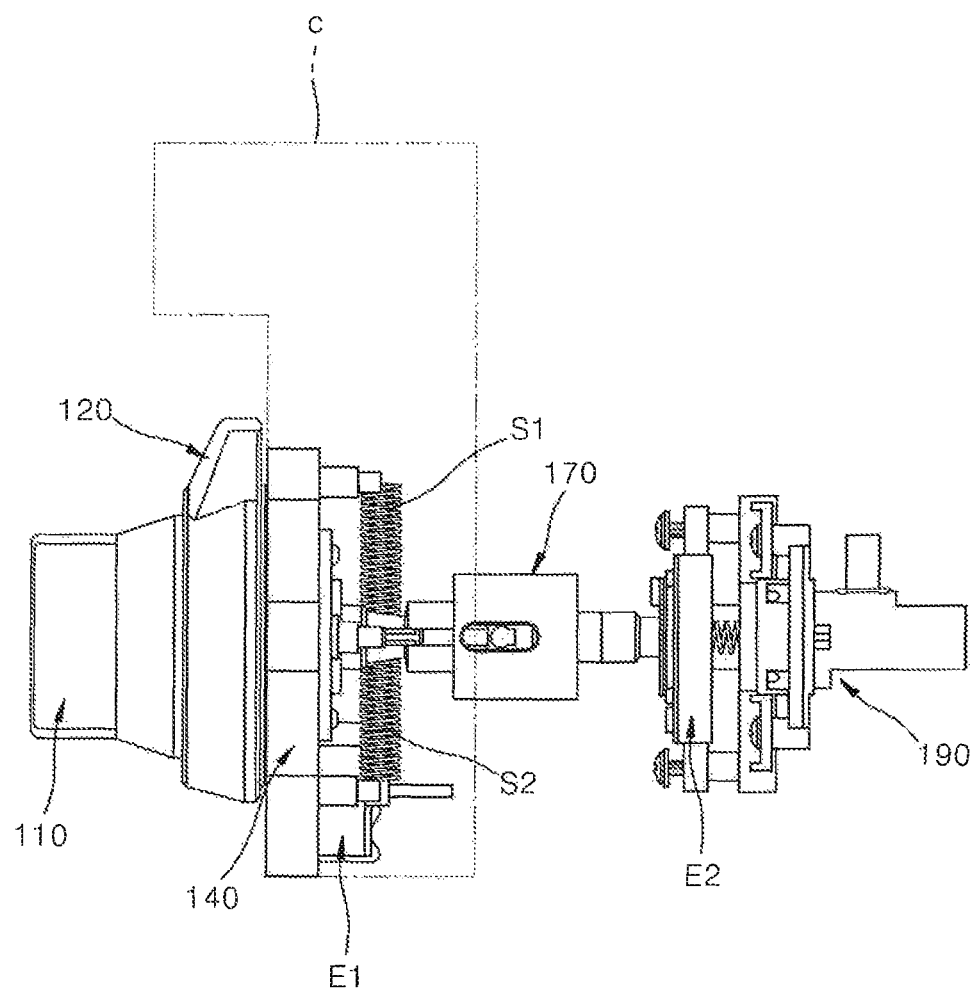
FIG. 3 is a side view of a coupling state of a knob assembly according to an embodiment.
Figure 4:
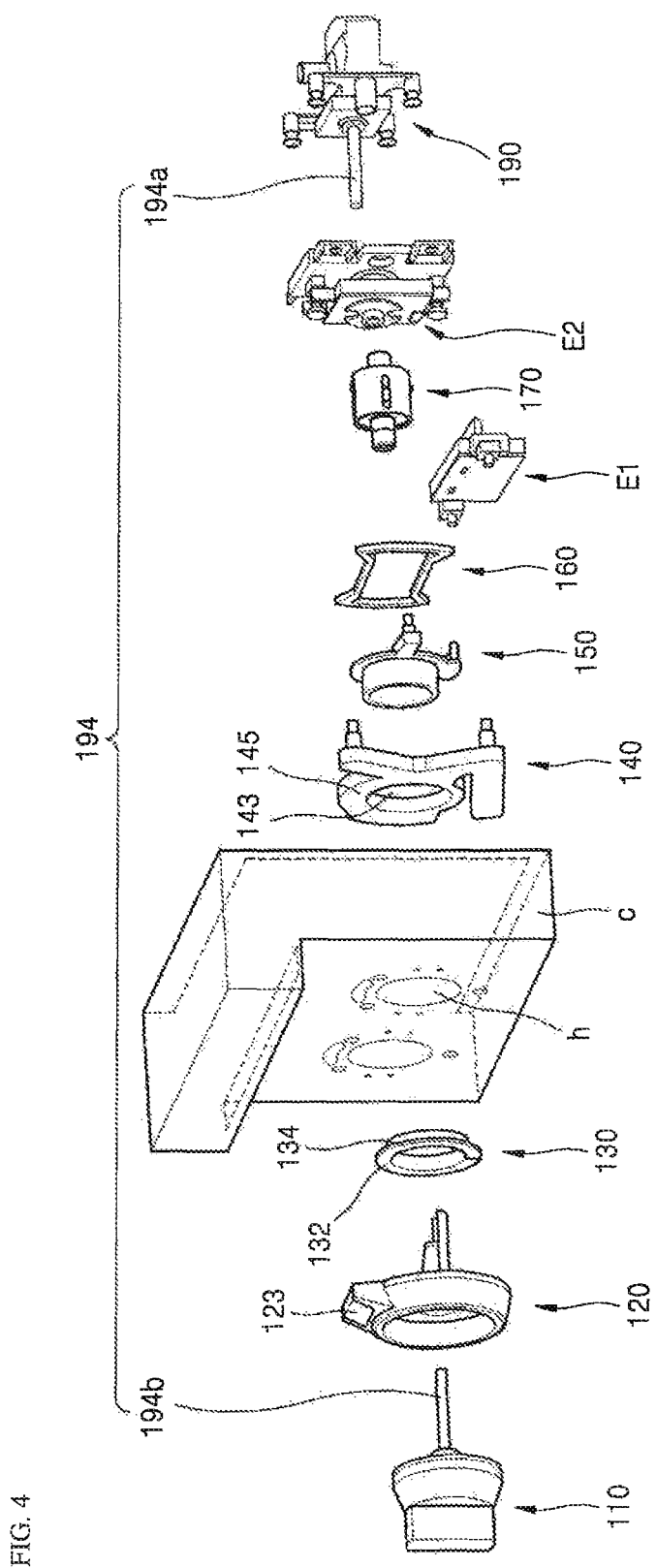
FIG. 4 is an exploded perspective view of the knob assembly of FIG. 3.
Figure 5:
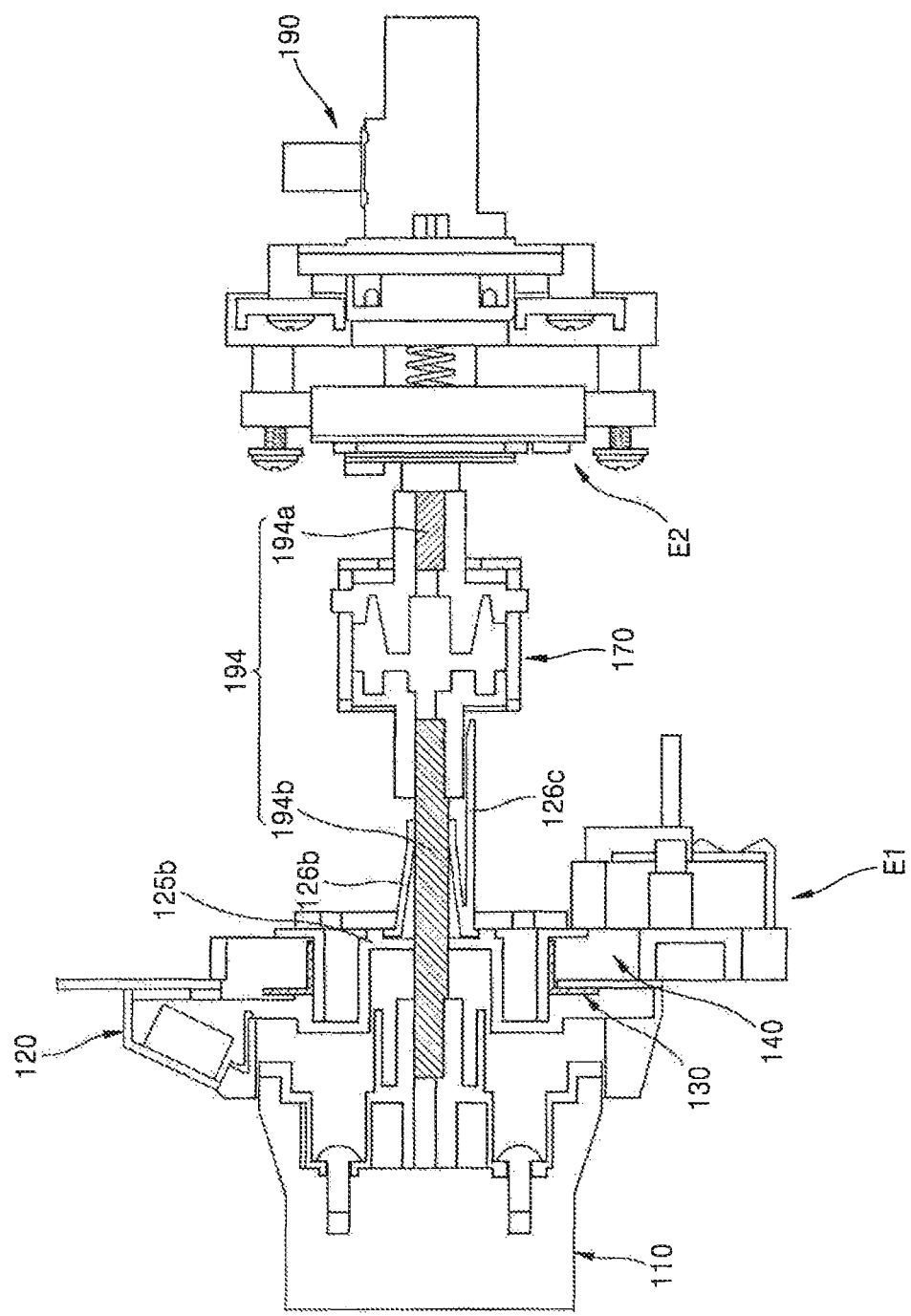
FIG. 5 is a cross-sectional view of the coupling state of the knob assembly of FIG. 3.

Referring to FIG. 3 to FIG. 5, a knob 110 may be connected to a valve shaft 194a of a valve assembly 190 provided to adjust a heating power. The knob 110 may be configured with a no-return type rotary switch, for example. Such a knob 110 may be provided in which a position thereof after the user rotates the knob 110 may be maintained without change, and an output of a corresponding heating element may be recognized according to an angle at which the knob 110 is rotated. For example, in a gas burner, a valve assembly 190 may be a valve that adjusts a gas supply amount, and in an electric stove or an induction stove, the valve assembly 190 may be an output adjusting means, for example, a variable resistor, configured to adjust an output.

As described above, the knob 110 may be connected to the valve shaft 194a of the valve assembly 190. In a knob assembly structure of a cooking appliance, the knob 110 may be directly coupled to a valve shaft. However, in such a structure in which the knob 110 is directly coupled to the valve shaft 194a, misalignment due to tolerance of the valve shaft 194a may be directly transferred to the knob 110, and accordingly, a problem in which the knob 110 and the knob ring 120 are misaligned may occur.

In the knob assembly of the embodiment, a structure in which a knob shaft 194b may be coupled to the knob 110, instead of the knob 110 being directly coupled to the valve shaft 194a, via a joint 170 may be provided. The joint 170 may absorb a position error of the valve shaft 194a between the knob shaft 194b and the valve shaft 194a and may perform an operation of transferring a rotating operation and a pressing operation of the knob 110 to the valve shaft 194a. A shaft connection body formed by connection between the valve shaft 194a of the valve assembly 190 and the knob shaft 194b coupled to the knob 110 may be referred to as an adjusting shaft 194.

The knob 110 may include a protruding handle portion having a circular shape. Although the handle portion may protrude in a bar shape as shown, for example, a shape of the handle portion may be changed to various other shapes. The knob 110 may be manufactured, for example, with a synthetic resin injection material or manufactured by processing a metal material. The material and shape of the knob 110 may be changed in various ways.

The knob ring 120 may be provided at an outer peripheral surface of the knob 110 to improve an exterior around the knob 110. The knob ring 120 may support the knob 110 and may improve quality of an exterior of the cooking appliance by finishing an exterior of the knob 110. The knob ring 120 may be provided to serve as a timer manipulating switch and a display configured to display, for example, time of a timer and a size or amount of heating power. The knob ring 120 may be installed to be rotatable independently from the knob 110, and the time of the timer may be set by rotating the knob ring 120. A display 123 may be provided at the knob ring 120, and the time of the timer and the size of heating power may be displayed through the display 123.

A first rotation sensing part or sensor E1 configured to sense a rotational amount of the knob 110 and a second rotation sensing part or sensor E2 configured to sense a rotational amount of the knob ring 120 may be provided in the knob assembly of this embodiment. The first rotating sensor E1 may sense a rotational amount of the adjusting shaft 194 connected to the knob 110. The second rotation sensor E2 may sense rotation of an actuating ring 150 connected to the knob ring 120.

The knob 110 and the knob ring 120 may be installed to be exposed to or at the outside of front panel c of a cooking appliance, and heating power or time of a timer, for example, may be displayed on the display 123 provided at the knob ring 120 installed. The heating power displayed on the display 123 may be a value calculated based on a value of a sensed rotational amount of the knob 110, and the time of the timer displayed on the display 123 may be a value calculated based on a value of a sensed rotational amount of the knob ring 120.

The display 123 may be configured so that a heating power-displaying portion and a timer time-displaying portion may be separately provided. However, the embodiments are not limited thereto and, for example, a heating power or a timer time may be selectively displayed on the display 123. For example, the display 123 may be operated such that only a heating power may be displayed when a timer is not set, and a heating power may be displayed for a predetermined amount of time and then a timer time may be displayed for a predetermined amount of time when the timer is set.

In this case, color of light when a heating power is displayed and color of light when a timer time is displayed may be made different so that a user may easily recognize which of the heating power and the timer time a displayed number may be indicating. For example, the heating power may be displayed with a red color, and the timer time may be displayed with a white or blue color. When both the heating power and the timer time are displayed, the heating power may be displayed for 2 seconds and then the timer time may be displayed for the next 2 seconds. Both the heating power and the timer time may be displayed through the knob assembly. Information necessary for using a cooking appliance may be effectively provided to a user without a separate display being installed at the front panel c.

The actuating ring 150 may be coupled to a rear surface of the knob ring 120 and may be provided to integrally rotate with the knob ring 120. A rotational amount of the actuating ring 150 and a rotational amount of the knob ring 120 may be the same, and therefore, manipulation of the knob ring 120 may be sensed by sensing the rotational amount of the actuating ring 150. For this, a knob ring gear part or gear G2 may be provided at the actuating ring 150.

The actuating ring 150 may include a coupling shaft part or shaft 151, a flange part or flange 152, and a wing part or wing 153. The coupling shaft 151 may be a portion that passes through a support frame 140 and may be supported to be rotatable by the support frame 140. The coupling shaft 151 may be formed in a shape of a circular tube, and a space through which the adjusting shaft 194 may pass may be formed inside the coupling shaft 151. The coupling shaft 151 may be coupled to the knob ring 120 via the front panel c and the support frame 140, and in this way, coupling that allows the actuating ring 150 to be integrally rotated with the knob ring 120 may be performed.

The flange 152 may be a flange that protrudes from a rear end of the coupling shaft 151 outward in a diametric direction of the coupling shaft 151. With respect to the frontward panel c, a direction toward the outside of the front panel c may be referred to as a front or a first direction, and a direction toward the valve assembly 190 may be referred to as a rearward or a second direction. By forming a flat surface coming into contact with the support frame 140 behind the support frame 140, the flange 152 may prevent deviation of the actuating ring 150 in the frontward direction and may allow the actuating ring 150 to be stably rotated without swinging in the frontward and the rearward directions.

The wing 153 may be formed to protrude from an outer peripheral surface of the coupling shaft 151 outward in a radial direction of the coupling shaft 151. Unlike the flange 152 formed in the shape of a disc that surrounds the coupling shaft 151, the wing 153 may be formed in a shape of a bar extending outward in the diametrical direction of the coupling shaft 151. The wing 153 may be inserted into a fixing frame 160. Such a wing 153 may move within a movement-possible region or movement range inside the fixing frame 160, and movement thereof may be limited from a point interfering with an upper inner wall or a lower inner wall of the fixing frame 160.

When the movement range of the wing 153 is limited by the fixing frame 160, an angle of rotation in both directions of the actuating ring 150 may be limited to a predetermined range. The wing 153 may also include a coupling portion between elastic members or returning springs S1, S2 and the actuating ring 150.

The support frame 140 may be coupled to the front panel c and may support the knob ring 120. The knob 110 and the knob ring 120 may be coupled to aligned positions of the front panel c, and the front panel c may be formed of a thin metal plate. When a hole h is formed in the front panel c, and the knob ring 120 is rotated by being directly rubbed against the hole h, a problem in which the knob ring 120 may be cut due to the front panel c may occur.

A structure in which the support frame 140 may be installed behind the hole h formed in the front panel c, and the knob ring 120 may be rotated while the knob ring 120 is supported by the support frame 140 so that generation of friction between the knob ring 120 and the front panel c during rotation of the knob ring 120 may be suppressed may be provided. The support frame 140 may include a frame main body 141, a through-hole 143, and a support part or support 145. The frame main body 141 may form a frame of the support frame 140 and may be coupled to the front panel c to be provided behind the front panel c.

The through-hole 143 corresponding to an outer diameter of the actuating ring 150 coupled to the knob ring 120 may be formed to pass through an inner side of the frame main body 141. Such a through-hole 143 may form a path for the coupling shaft 151 of the actuating ring 150 to pass through the support frame 140 in the frontward and rearward directions.

The support 145 forming a sidewall configured to support the coupling shaft 151 to be rotatable around the through-hole 143 may be formed outside the through-hole 143. The actuating ring 150 may be seated on the support 145, and accordingly, the actuating ring 150 may be supported by the support frame 140 to be rotated at a predetermined position.

The knob ring 120 coupled to such an actuating ring 150 may be supported to be rotated about a predetermined axis on the support frame 140 by a support structure between the support frame 140 and the actuating ring 150. Because a position of the knob ring 120 is determined by the support frame 140, and the support frame 140 is fastened to the front panel c, the position of the knob ring 120 may be fixed with respect to the front panel c.

The support frame 140 may surround the outer peripheral surface of the actuating ring 150 and may support the actuating ring 150 to be rotatable about the predetermined axis. The support frame 140 may be coupled to a guide rod 210 provided at a burner frame 200 to which the valve assembly 190 may be fixed. The guide rod 210 may be provided to fix the burner frame 200 and the support frame 140, and the support frame 140 coupled to such a guide rod 210 may be fixed to or at a predetermined position with respect to the burner frame 200.

The fixing frame 160 may be provided to prevent the actuating ring 150 from being deviated rearward toward the inside of the appliance from the fixing frame 160, may be installed at a rear or second side of the front panel c, and may be fastened and fixed to the support frame 140 by a fastening means, such as, for example, a screw. The fixing frame 160 may also restrict a range of rotation of the actuating ring 150. Such a fixing frame 160 may limit rotation of the actuating ring 150 and the knob ring 120 so that the actuating ring 150 and the knob ring 120 may be rotatable in the horizontal direction only within a predetermined angle range.

The fixing frame 160 may be formed, for example, in a shape similar to that of a bow tie. In the fixing frame 160, portions corresponding to wings of a bow may be portions configured to limit rotation of the actuating ring 150 so that the actuating ring 150 may be rotatable within a predetermined angle range, and a portion connecting both wings may be a portion configured to prevent rearward deviation of the actuating ring 150.

The fixing frame 160 may include a fixing part or portion 161 and a wing insertion part or portion 163. The fixing portion 161 may be coupled to the support frame 140 and may support the actuating ring 150. Such a fixing portion 161 may correspond to a portion connecting both wings in the fixing frame 160 formed in the shape similar to that of a bow tie. For example, the fixing portion 161 may be provided at a rear or second side of the flange 152 of the actuating ring 150 and may be coupled to the frame main body 141, with the flange 152 being provided therebetween, to support the actuating ring 150 in a direction in which the flange 152 and the wing 153 may be adhered to the frame main body 141.

In this way, a position of the actuating ring 150 in the frontward and rearward directions may be restricted by a front or first side of the flange 152 supported by the support frame 140 and a rear or second side of the flange 152 supported by the fixing frame 160. The actuating ring 150 may be rotated at a predetermined position while the position thereof in the frontward and rearward directions may be restricted as above, and the actuating ring 150 may stably fix a rotary position of the knob ring 120.

The wing insertion portion 163 may be provided at each of both sides of the fixing portion 161. Such wing insertion portions 163 may correspond to portions corresponding to the wings of the bow in the fixing frame 160 formed in the shape similar to that of a bow tie. In each of the wing insertion portion 163, the wing 153 of the actuating ring 150 may be inserted to be rotated within a predetermined angle range. That is, the wing 153 inserted into the wing insertion portion 163 may move within a movement-possible region or movement range inside the wing insertion portion 163, and movement thereof is limited from a point interfering with an upper inner wall or a lower inner wall of the wing insertion portion 163. When the movement range of the wing 153 is limited by the wing insertion portion 163 as above, an angle of rotation in both directions of the actuating ring 150 may be limited to a predetermined range.

A bearing shell 130 may serve as a bearing that facilitates manipulation of the knob ring 120. Such a bearing shell 130 may include a cylindrical part or portion 134 formed in a cylindrical shape and a disc 132 bent from the cylindrical portion 134 and protruding in a radial direction. The cylindrical portion 134 may be inserted between the outer peripheral surface of the actuating ring 150 coupled to the knob ring 120 and an inner peripheral surface of the fixing frame 160. Such a cylindrical portion 134 may reduce friction between the actuating ring 150 and the fixing frame 160.

The disc 132 may be inserted between the front panel c and the knob ring 120. Such a disc 132 may reduce friction between the knob ring 120 and the front panel c. The disc 132 may also cause the knob ring 120 to be spaced apart from the front panel c at a predetermined interval to suppress the front panel c from being scratched due to the knob ring 120 coming into contact with the front panel c during manipulation of the knob ring 120.

The knob ring 120 may be provided in the form in which a return-type manipulation may be possible. For example, the knob ring 120 may be provided in the form in which the knob ring 120 may be manipulated to be rotatable within a predetermined angle range clockwise or counterclockwise and then may be returned to its original position when an external force is released.

The returning springs S1 and S2 may provide a restoration force for returning the knob ring 120 to an initial position. Such returning springs S1 and S2 may include a first returning spring S1 configured to provide a restoration force in a clockwise direction and a second returning spring S2 configured to provide a restoration force in a counterclockwise direction. For example, each of the returning springs S1 and S2 may be in the form of a coil spring having one or a first longitudinal side fixed to the actuating ring 150 and another or second longitudinal side fixed to the support frame 140.

Wing-side coupling parts or couplers 155 to which the one longitudinal sides of the returning springs S1 and S2 may be coupled may be provided at respective wings 153 of the actuating ring 150, and frame-side couplers 147 and 148 to which the other longitudinal sides of the returning springs S1 and S2 may be coupled may be provided at respective portions of frame main body 141 of the support frame 140.

For example, the wing-side couplers 155 and the frame-side couplers 147 and 148 may be provided as protrusions that protrude from the respective wings 153 or frame main body 141. The returning springs S1 and S2 may be fixed by hooks respectively provided at both longitudinal sides of the returning springs S1 and S2 being hooked to the wing-side couplers 155 and the frame-side couplers 147 and 148.

The frame-side couplers 147 and 148 may include a first frame-side coupler 147 provided above the wing-side couplers 155 and having the first returning spring S1 coupled thereto, and a second frame-side coupler 148 provided below the wing-side couplers 155 and having the second returning spring S2 coupled thereto. The first returning spring S1 may be installed such that one longitudinal side thereof may be coupled to the wing-side coupler 155 and the other longitudinal side thereof may be coupled to the first frame-side coupler 147. The second returning spring S2 may be installed such that one longitudinal side thereof may be coupled to the other wing-side coupler 155 and the other longitudinal side thereof may be coupled to the second frame-side coupler 148.

When an external force is not applied, elastic forces of the first returning spring S1 and the second returning spring S2 installed as above may be balanced, and accordingly, the knob ring 120 may be maintained at an initial position. Because the actuating ring 150 and the knob ring 120 are integrally rotated, the knob ring 120 may be maintained at an initial position due to the elastic forces of the returning springs S1 and S2 connected to the actuating ring 150. The knob ring 120 maintained at the initial position may be rotated at a predetermined angle clockwise or counterclockwise, and when an external force is released while the knob ring 120 is rotated, the knob ring 120 may be returned to its original or initial position due to restoration forces provided by the returning springs S1 and S2.

For example, when the knob ring 120 is manipulated counterclockwise, the first returning spring S1 elongated due to rotation of the knob ring 120 may provide a restoration force for returning the knob ring 120 to its initial position, and when the knob ring 120 is manipulated clockwise, the second returning spring S2 elongated due to rotation of the knob ring 120 may provide a restoration force for returning the knob ring 120 to the initial position.

Figure 6:
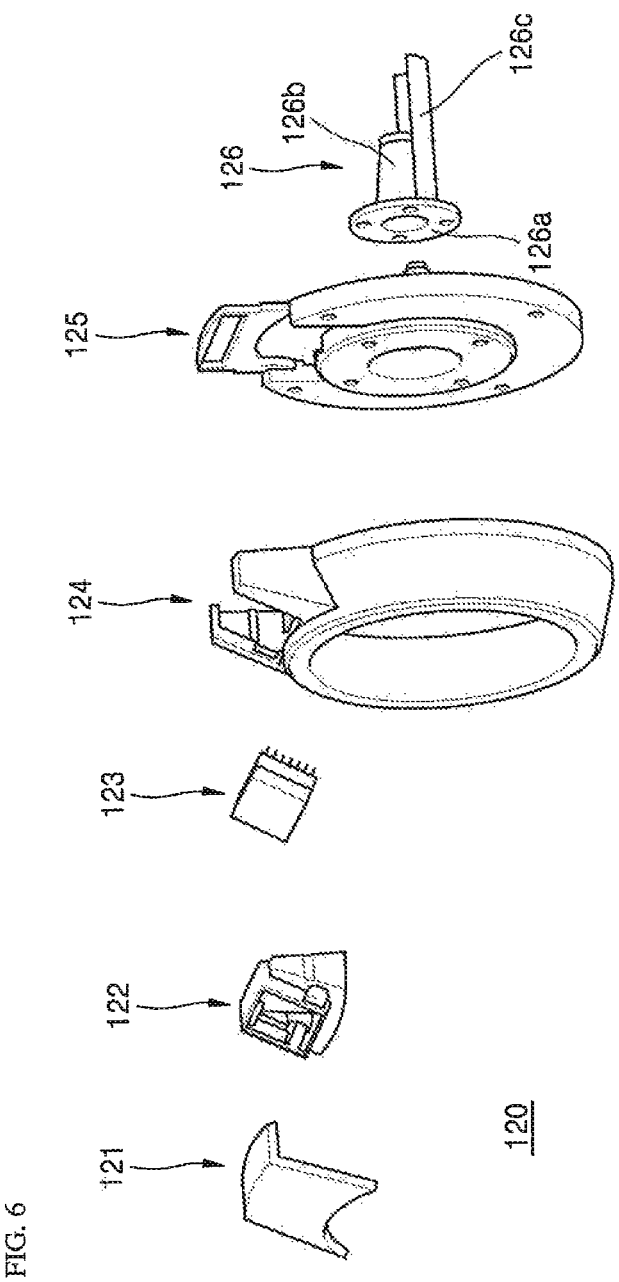
FIG. 6 is an exploded perspective view of a knob ring according to an embodiment.
Figure 7:
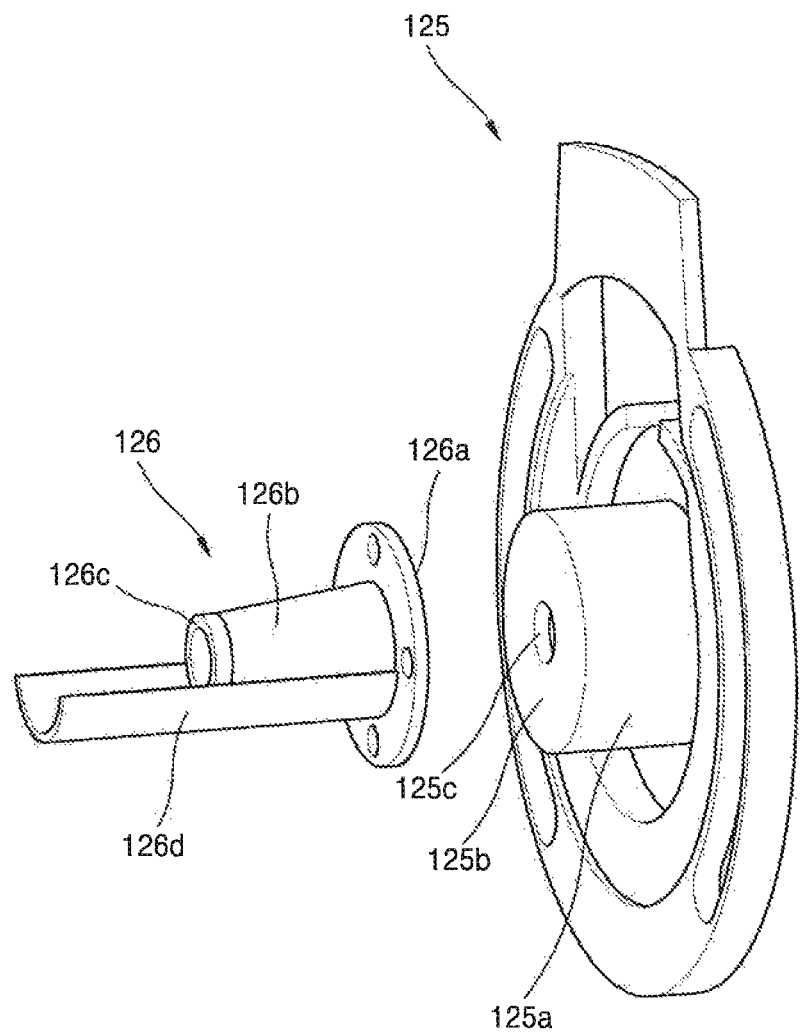
FIG. 7 is a rear perspective view of rear surfaces of some components of the knob ring of FIG. 6.

Referring to FIG. 6 and FIG. 7, the knob ring 120 may include a knob ring main body 124, a rear plate 125, and a support tube 126. The knob ring main body 124 may form an exterior of the knob ring 120. For example, the knob ring main body 124 may be formed in a shape including a ring shape. The rear plate 125 may be formed in a shape including a disc shape and may be coupled to a rear or second surface of the knob ring main body 124. Such a rear plate 125 may include a support plate 125b that enters the front panel c (see FIG. 3) and protrudes toward an inner portion of the cooking appliance. A support hole 125c configured to form a path for the adjusting shaft 194 (see FIG. 3) to pass through the knob ring 120, and support the adjusting shaft 194 may be provided in the support plate 125b.

The support tube 126 provided to support the adjusting shaft 194 may be coupled to the rear plate 125. The support tube 126 may include a flange 126a coupled to the rear plate 125, a tapered tube 126b extending from the flange 126a, and a support rib 126d extending more than or past the tapered tube 126b. The tapered tube 126b may have a tapered shape in which a diameter thereof becomes narrower away from the flange 126a, and may include a cap 126c provided at an end thereof and configured to support the adjusting shaft 194. In the knob ring 120 including the above-described configurations, a two-point support structure in which the adjusting shaft 194 is supported at the support hole 125c and the cap 126c may be provided.

Because the adjusting shaft 194 is installed to be movable by a joint instead of being restricted to a predetermined position, a structure capable of stably supporting the adjusting shaft 194 may be necessary. For this, the two-point support structure, in which the adjusting shaft 194 is supported at the support hole 125c and the cap 126c, may be provided by the knob ring 120 such that the adjusting shaft 194 may be stably supported. In addition to the support structure configured to support the adjusting shaft 194 at two or more points, the knob ring 120 may also provide a support structure capable of supporting a front end of a gear coupled to the adjusting shaft 194.

The display 123 capable of displaying a heating power or a timer time may be provided at the knob ring 120. The display 123 may be coupled to the knob ring main body 124 via a display housing 122, and a finishing cap 121 may be coupled to an outer portion of the display device 123. The finishing cap 121 may be formed with a transparent or translucent material to allow information displayed on the display 123 to be viewed from an outside.

Figure 8:
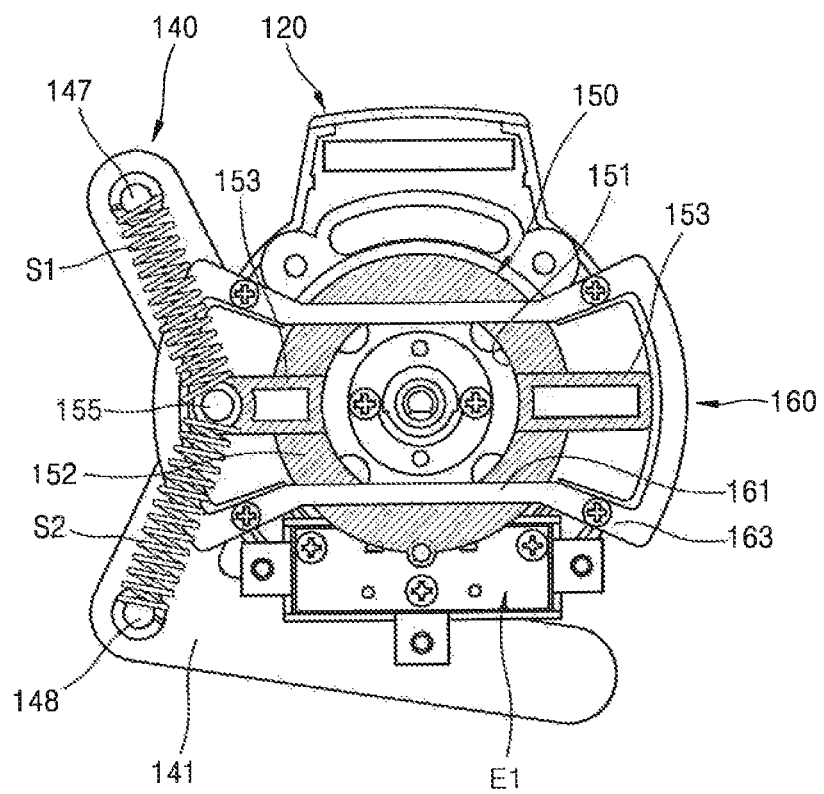
FIG. 8 is a rear view showing an assembly structure of the knob assembly of FIG. 3.
Figure 9:
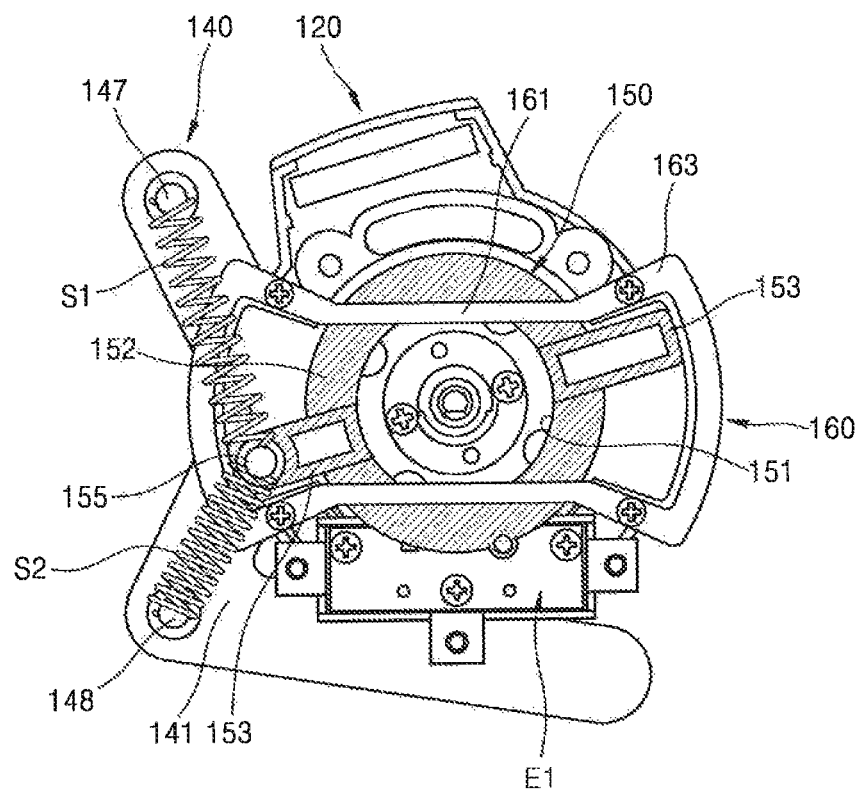
FIG. 9 is a view of a manipulation state in which a knob ring of the knob assembly of FIG. 8 is rotated counterclockwise.
Figure 10:
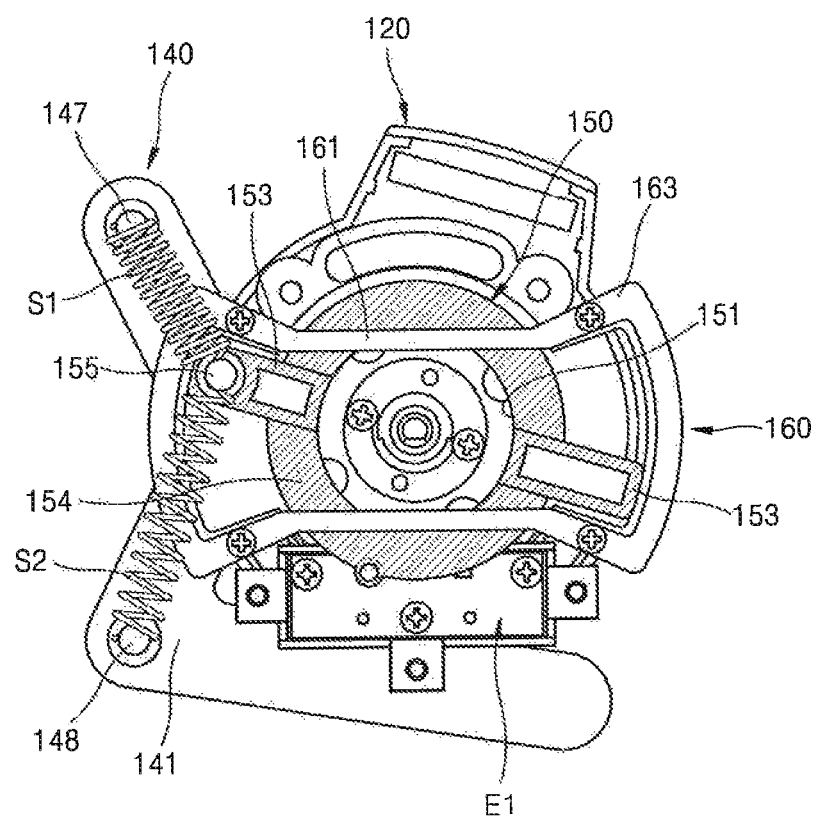
FIG. 10 is a view of a manipulation state in which the knob ring of the knob assembly of FIG. 8 is rotated clockwise.
Figure 11:
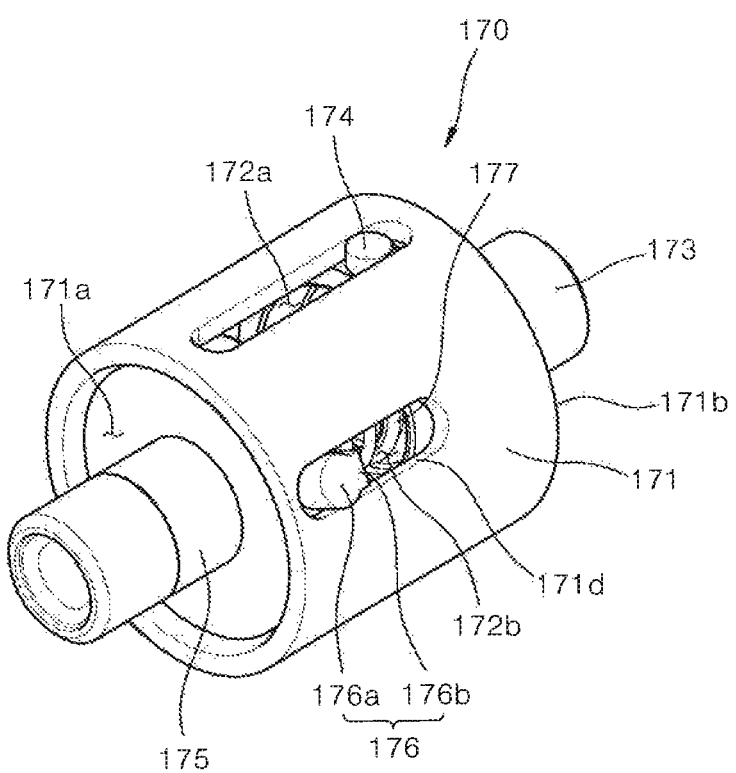
FIG. 11 is a perspective view of a joint according to an embodiment.
Figure 12:
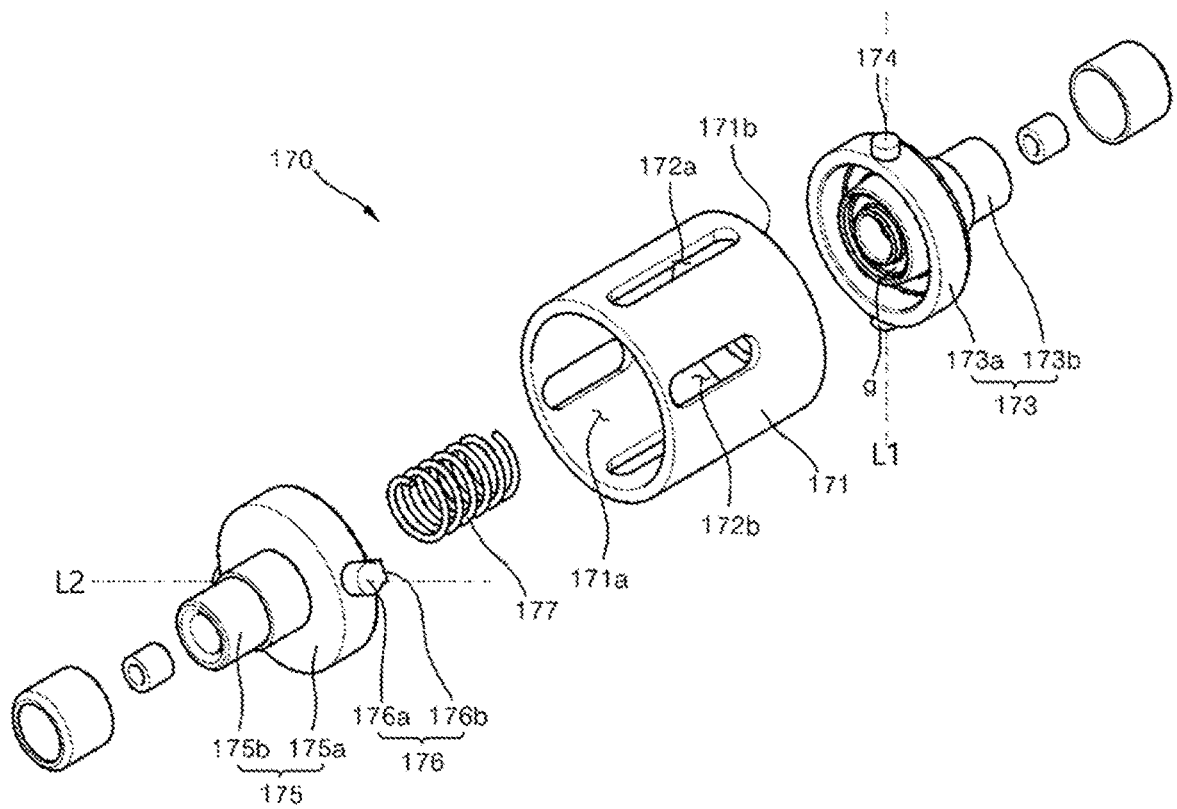
FIG. 12 is an exploded perspective view of the joint of FIG. 11.
Figure 13:
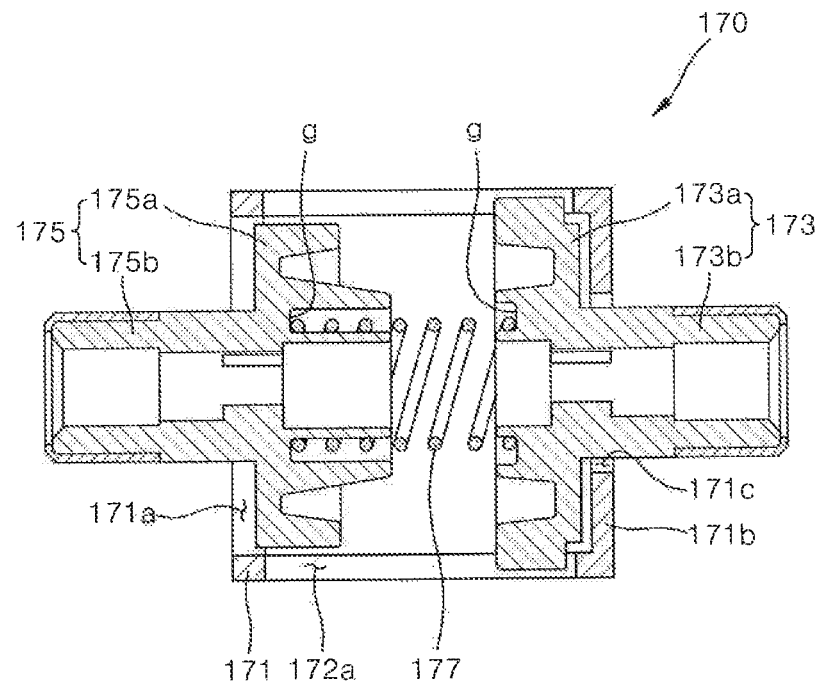
FIG. 13 is a cross-sectional view showing an internal structure of the joint of FIG. 11.

FIG. 8 is a rear view of the knob assembly, FIG. 9 is a view of a manipulation state in which a knob ring of the knob assembly in FIG. 8 is rotated counterclockwise, and FIG. 10 is a view of a manipulation state in which the knob ring of the knob assembly in FIG. 8 is rotated clockwise. For convenience of illustration, the front panel c has been omitted in FIG. 8 to FIG. 10.

Referring to FIG. 3 and FIG. 8, the knob 110 and the knob ring 120 may be coupled to the front or first side of the front panel c, and the support frame 140, the actuating ring 150, and the fixing frame 160 may be coupled to the rear or second side of the front panel c. The fixing frame 160 may be fastened to the rear or second surface of the front panel c, and the actuating ring 150 may be fastened to the knob ring 120 via the front panel c.

A center of rotation of the actuating ring 150 may coincide with a center of rotation of the knob 110. The actuating ring 150 may restrict the center of rotation of the knob 110 to be at a regular or predetermined position with respect to the front panel c. When the actuating ring 150 is fixed at a regular position with respect to the front panel c, the knob 110 may be fixed at an accurate position with respect to the front panel c.

The actuating ring 150 may be inserted into the support frame 140, and a portion thereof may pass through the front panel c and protrude from the front or first surface of the front panel c. A front or first end of the actuating ring 150 may be formed in a cylindrical shape, and the cylindrical portion may protrude from the front or first surface of the front panel c.

The knob ring 120 may be coupled to the cylindrical portion of the actuating ring 150 protruding from the front or first surface of the front panel c. By the knob ring 120 being coupled to the actuating ring 150 supported by the support frame 140, a support structure in which the knob ring 120 is supported by the support frame 140 may be formed as a result.

Manipulation of the knob ring 120 may be recognized by rotation of the actuating ring 150, which may be rotated by being interlocked with rotation of the knob ring 120. As the knob ring 120 is a portion exposed to the outside of the front panel c, it may not be desirable in terms of appearance for the second rotation sensor E2, configured to sense manipulation of the knob ring 120, to be installed around the knob ring 120 outside the front panel c. Thus, the second rotation sensor E2 may be installed around or at the actuating ring 150, which is the inside of the front panel c, and the second rotation sensor E2 installed may sense rotation of the knob ring 120 by sensing rotation of the actuating ring 150 inside the front panel c.

The fixing frame 160 configured to prevent the actuating ring 150 from being deviated rearward and allow the actuating ring 150 to be stably operated may be included. The fixing frame 160 may be provided to cross the rear or second surface of the actuating ring 150 and be fixed to the support frame 140. The fixing frame 160 may prevent the actuating ring 150 from being deviated rearward and limit a rotational range of the actuating ring 150 within a designated or predetermined range.

The actuating ring 150 may include the wing 153 formed to extend sideward from a center of the actuating ring 150, and the wing 153 may be inserted into the fixing frame 160. The wing 153 inserted into the fixing frame 160 may move within a movement-possible region or movement range inside the fixing frame 160, and movement thereof may be limited from a point interfering with the upper inner wall or the lower inner wall of the fixing frame 160. When the movement range of the wing 153 is limited by the fixing frame 160, the angle of rotation in both directions of the actuating ring 150 may be limited to a predetermined range. By applying a structure in which the wing 153 is provided at each side of the actuating ring 150, and movement ranges of the wings 153 are limited at a same position, the rotational range of the actuating ring 150 may be more stably limited.

The actuating ring 150 may be connected to the returning springs S1 and S2 configured to provide an elastic force for returning the actuating ring 150, which is rotated to a position spaced apart from an initial position, to the initial position. Because the actuating ring 150 and the knob ring 120 are integrally rotated, the knob ring 120 may be maintained at an initial position due to elastic forces of the returning springs S1 and S2 connected to the actuating ring 150. The knob ring 120 maintained at the initial position may be rotated at a predetermined angle clockwise or counterclockwise, and when an external force is released while the knob ring 120 is rotated, the knob ring 120 may be returned to the initial position due to restoration forces provided by the returning springs S1 and S2.

For example, when the actuating ring 150 is rotated counterclockwise due to manipulation of the knob ring 120 as shown in FIG. 9, the first returning spring S1 of the pair of returning springs S1 and S2 may provide an elastic force acting clockwise for the actuating ring 150 to be returned to an initial position. When the actuating ring 150 is rotated clockwise due to manipulation of the knob ring 120 as shown in FIG. 10, the second returning spring S2 may provide an elastic force acting counterclockwise for the actuating ring 150 to be returned to the initial position.

Referring to FIG. 3, the knob assembly may include the joint 170 installed between the valve assembly 190 and the knob 110. The joint 170 may be a joint provided to be movable in vertical and horizontal directions to transmit power in an axial direction. In contrast to a structure in which the valve shaft 194a included in the valve assembly 190 is directly connected to the knob, a structure in which a separate knob shaft 194b is provided at the knob 110, and the valve shaft 194a and the knob shaft 194b are connected to each other with the joint 170 may be provided.

Such a structure is a structure in which a tolerance of the valve shaft 194a that occurs in the valve assembly 190 may be absorbed by the joint 170. Therefore, even when the valve shaft 194a is misaligned due to tolerance, the valve shaft 194a may be assembled at accurate or correct (predetermined) positions to the front panel c of the knob 110 and the knob ring 120, and accordingly, the knob 110 may be assembled at a regular or correct position at the front panel c.

In other words, the knob 110 and the knob ring 120 may be assembled at regular or correct (predetermined) positions with respect to the front panel c, and the valve assembly 190 may be assembled or connected to a burner. Accordingly, even when the valve shaft 194a extending from the valve assembly 190 assembled to the burner is misaligned at the regular or predetermined position of the front panel c, such misalignment may be absorbed by the joint 170, thereby allowing the knob 110 and the knob ring 120 to be assembled at accurate or correct positions with respect to the front panel c.

Such a structure of the knob assembly may allow the knob 110 and the knob ring 120 to be assembled at regular or predetermined positions with respect to the front panel c regardless of a tolerance or error that may occur when manufacturing the valve shaft, and may facilitate operations of the knob 110 and the knob ring 120.

Referring to FIG. 3 and FIG. 11 to FIG. 13, the joint 170 may be installed between the valve shaft 194a and the knob shaft 194b to connect the valve shaft 194a and the knob shaft 194b to each other, and may include a housing 171, a first shaft support 173, a second shaft support 175, an elastic member or spring 177, and coupling shafts 174 and 176. The coupling shafts 174 and 176 may include a first coupling shaft 174 and a second coupling shaft 176.

The housing 171 may be formed in a cylindrical shape having a predetermined length and having a hollow or an inner space formed therein. An insertion hole 171a configured to allow the inner space of the housing 171 to be open to an outside of the housing 171 may be formed at one or a first longitudinal side of the housing 171. At a side facing the insertion hole 171a, that is, at another or second longitudinal side of the housing 171, a side plate 171b configured to block the other or second longitudinal side of the housing 171 may be provided. A through-hole 171c configured to allow the inner space of the housing 171 to be open to the outside of the housing 171 may be formed inside the side plate 171b.

A plurality of slots 172a and 172b may be formed in the housing 171. Each of the slots 172a and 172b may be in the form of a slot extending in the longitudinal direction of the housing 171 and having a predetermined width extending in a circumferential direction of the housing 171 and a predetermined length extending in a longitudinal direction of the housing 171. A pair of first slots 172a and a pair of second slots 172b may be formed in the housing 171.

The pair of first slots 172a may be formed to respectively pass through side surfaces of the housing 171 forming a curved surface and to face each other when viewed from the one longitudinal side or the other longitudinal side of the housing 171. The pair of second slots 172b may be formed to respectively pass through the side surfaces of the housing 171 forming a curved surface and to face each other, at positions different from the first slots 172a, when viewed from the one longitudinal side or the other longitudinal side of the housing 171. When viewed from the one longitudinal side or the other longitudinal side of the housing 171, the pair of first slots 172a and the pair of second slots 172b may be arranged to form the shape of a cross.

A pair of first coupling shafts 174 arranged in a line L1, which is a first rotational center, at the first shaft support 173 may be inserted into the pair of first slots 172a, which may be provided to face each other, to be linearly movable and rotatable in the longitudinal direction of the housing 171. A pair of second coupling shafts 176 arranged in a line L2, which is a second rotational center, at the second shaft support 175 may be inserted into the pair of second slots 172b, which may be provided to face each other, to be linearly movable and rotatable in the longitudinal direction of the housing 171.

By fitting and coupling between the pair of first slots 172a and the first coupling shafts 174, the first shaft support 173 may be linearly movable and rotatable in the housing 171. By fitting and coupling between the pair of second slots 172b and the second coupling shafts 176, the second shaft support 175 may be coupled to be linearly movable and rotatable in the housing 171.

The first shaft support 173 may be inserted into the inner space of the housing 171 through the insertion hole 171a. The first shaft support 173 may be connected to any one of the valve shaft 194a and the knob shaft 194b, and may include a support main body 173a, a first coupling shaft 174, and a shaft fixing portion 173b. For example, the first shaft support 173 may be connected to the valve shaft 194a. The support main body 173a may be inserted into the inner space of the housing 171 and may be coupled to the housing 171 by the pair of first coupling shafts 174 arranged in a line to be integrally moved and rotated with the first coupling shafts 174.

The shaft fixing portion 173b may extend in the longitudinal direction of the housing 171 from the support main body 173a, may protrude to the outside of the housing 171, and may be integrally moved and rotated with the support main body 173a. The shaft fixing portion 173b may be a portion provided to connect the first shaft support 173 and the valve shaft 194a, and the first shaft support 173 and the valve shaft 194a may be connected by the valve shaft 194a being coupled to the shaft fixing portion 173b. The shaft fixing portion 173b may protrude to the outside of the housing 171 through the other longitudinal side of the housing 171, may be coupled to the valve shaft 194a outside the housing 171, and may pass through the side plate 171b through a path secured by the through-hole 171c formed to pass through the inside of the side plate 171b to protrude to the outside of the housing 171.

When the support main body 173a is rotated about the first coupling shaft 174 by rotation of the first coupling shaft 174, a direction in which an end of the shaft fixing portion 173b faces may be changed by an angle at which the support main body 173a is rotated. A change in the direction in which the end of the shaft fixing portion 173b faces may be indicated as a change in a posture of the first shaft support 173.

The second shaft support 175 may be inserted into the inner space of the housing 171 through the insertion hole 171a and may be provided between the insertion hole 171a and the first shaft support 173. The second shaft support 175 may be connected to the other one of the valve shaft 194a and the knob shaft 194b, and may include a support main body 175a, a second coupling shaft 176, and a shaft fixing portion 175b. For example, the second shaft support 175 may be connected to the knob shaft 194b. The support main body 175a may be inserted into the inner space of the housing 171 and may be coupled to the housing 171 by the pair of second coupling shafts 176 arranged in a line to be integrally moved and rotated with the second coupling shafts 176.

The shaft fixing portion 175b may extend in the longitudinal direction of the housing 171 from the support main body 175a, may protrude to the outside of the housing 171, and may be integrally moved and rotated with the support main body 175a. The shaft fixing portion 175b may be a portion provided to connect the second shaft support 175 and the knob shaft 194b, and the second shaft support 175 and the knob shaft 194b may be connected by the knob shaft 194b being coupled to the shaft fixing portion 175b. The shaft fixing portion 175b may protrude to the outside of the housing 171 through the one longitudinal side of the housing 171, may be coupled to the knob shaft 194b outside the housing 171, and may protrude to the outside of the housing 171 through a path secured by the insertion hole 171a.

When the support main body 175a is rotated about the second coupling shaft 176 by rotation of the second coupling shaft 176, a direction in which an end of the shaft fixing portion 175b faces may be changed by an angle at which the support main body 175a is rotated. A change in the direction in which the end of the shaft fixing portion 175b faces may be indicated as a change in a posture of the second shaft support 175.

The spring 177 may be inserted into the inner space of the housing 171 through the insertion hole 171a and may be provided between the first shaft support 173 and the second shaft support 175. The spring 177 may provide an elastic force for returning positions of the first shaft support 173 and the second shaft support 175 changed due to linear movement of the coupling shafts 174 and 176 and postures of the first shaft support 173 and the second shaft support 175 changed due to rotation of the coupling shafts 174 and 176 to original or initial states.

For example, the spring 177 may include a coil spring having a length extending in the longitudinal direction of the housing 171. One or a first longitudinal side of the spring 177 may be coupled to the first shaft support 173, and another or second longitudinal side of the spring 177 may be coupled to the second shaft support 175. The spring 177 may be provided to be elastically stretched in the longitudinal direction and to be elastically bent in a rotating direction of the first shaft support 173 or the second shaft support 175.

A fitting groove g to which the one longitudinal side of the spring 177 may be fitted and coupled and another fitting groove g to which the other longitudinal side of the spring 177 may be fitted and coupled may be respectively formed at surfaces of the first shaft support 173 and the second shaft support 175 facing each other, for example, at surfaces of the support main body 173a and the support main body 175a facing each other. The spring 177 coupled to such fitting grooves g may be stably coupled to the first shaft support 173 and the second shaft support 175 while movement of the both longitudinal sides thereof may be restrained so that a position of the spring 177 with respect to the support main body 173a may not be changed.

Figure 14:
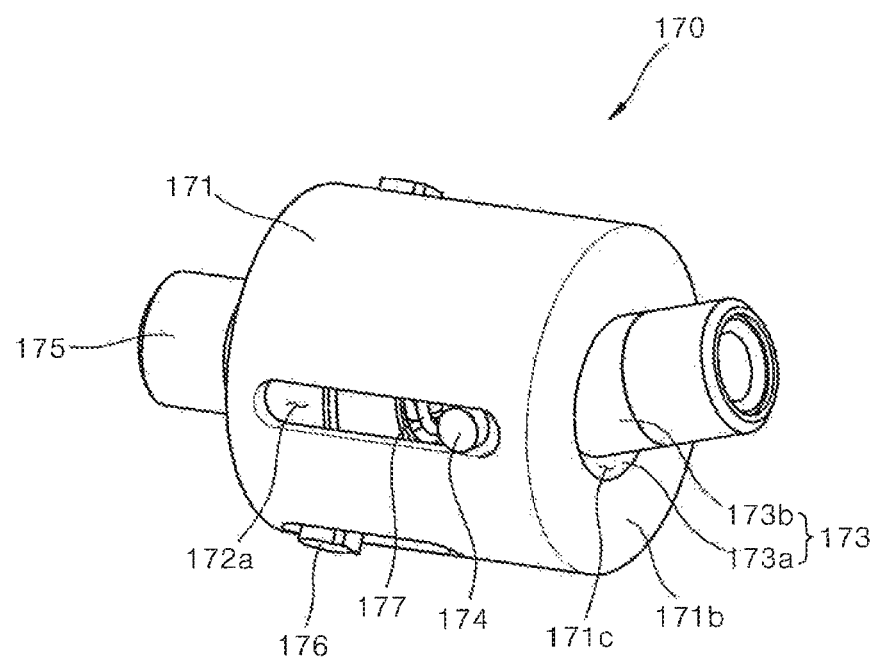
FIG. 14 is a view showing an operation example of the joint of FIG. 11.
Figure 15:
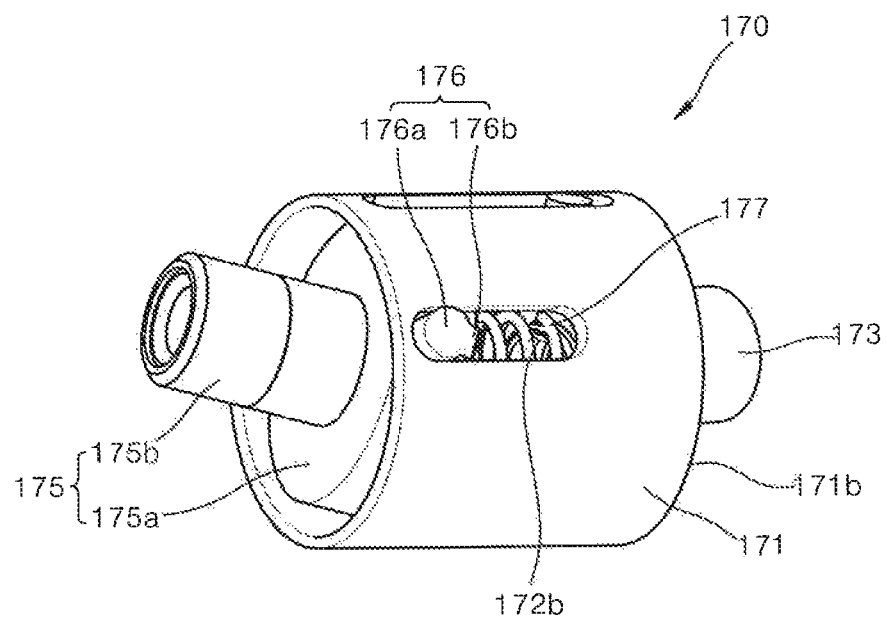
FIG. 15 is a view showing another operation example of the joint of FIG. 11.

In the joint 170 formed by the above-described configuration, the first shaft support 173 may be coupled to the housing 171 to be rotatable in any one of a vertical direction and a horizontal direction (see FIG. 14), and the second shaft support 175 may be coupled to the housing 171 to be rotatable in the other one of the vertical direction and the horizontal direction (see FIG. 15). That is, the joint 170 may connect the valve shaft 194a and the knob shaft 194b with a single flexible shaft while the first shaft support 173 is connected to the valve shaft 194a and the second shaft support 175 is connected to the knob shaft 194b, and may transmit or transfer rotation of the knob shaft 194b to the valve shaft 194a.

When a direction in which the valve shaft 194a extends or moves and a direction in which the knob shaft 194b extends or moves do not coincide with each other due to a tolerance of the valve shaft 194a that occurs in the valve assembly 190, the joint 170 may absorb the tolerance of the valve shaft 194a that occurs in the valve assembly 190 by a posture of at least one of the first shaft support 173 or the second shaft support 175 being changed and an angle of connection between the first shaft support 173 and the second shaft support 175 being changed.

In this case, if the joint 170 is connected to the valve shaft 194a and the knob shaft 194b, the angle of connection between the first shaft support 173 and the second shaft support 175 may not have to be adjusted by a worker, and postures of the first shaft support 173 and the second shaft support 175 may be changed to be suitable for connecting the valve shaft 194a and the knob shaft 194b when the valve shaft 194a and the knob shaft 194b are respectively connected to both ends of the joint 170. As the postures of the first shaft support 173 and the second shaft support 175 may be maintained or changed by an elastic force provided by the spring 177, a separate task for fixing the postures may not be required.

The joint 170 having the above-described configuration may be assembled by the following method. First, after the first shaft support 173 is tilted and inserted into the housing 171 through the insertion hole 171a, the first coupling shaft 174 may be fitted to the first slot 172a for the housing 171 and the first shaft support 173 to be assembled. When a direction in which the first shaft support 173 is rotated is assumed as a horizontal direction, a direction in which the first shaft support 173 is tilted to be inserted into the housing 171 may be assumed as a vertical direction.

Then, the spring 177 may be inserted into the housing 171 through the insertion hole 171a, the second shaft support 175 may be tilted and inserted into the housing 171, and the second coupling shaft 176 may be fitted to the second slot 172b for the housing 171 and the second shaft support 175 to be assembled. When a direction in which the second shaft support 175 is rotated is assumed as a vertical direction, a direction in which the second shaft support 175 is tilted to be inserted into the housing 171 is assumed as a horizontal direction. In such a process, the spring 177 may be stably coupled to the first shaft support 173 and the second shaft support 175 while both longitudinal ends thereof may be fitted to the fitting groove g, and movement of the both longitudinal sides may be restricted.

As described above, the joint 170 may be assembled by fitting and assembling the first shaft support 173 into the housing 171, inserting the spring 177 into the housing 171, and then fitting and assembling the second shaft support 175 into the housing 171. The joint 170 may be easily and rapidly assembled just by performing the above-described sequentially fitting tasks without using a separate fastening means or adhesive. As the joint 170 may be formed with four components, the components may be easily manufactured and managed, and the joint 170 may be more easily and rapidly assembled. When assembling the joint 170 is completed, as the fitted and coupled states of the first shaft support 173 and the second shaft support 175 are stably maintained by an elastic force provided by the spring 177, the joint 170 may not arbitrarily release while the joint 170 is being used.

The joint 170 may absorb a position error of the valve shaft 194a between the knob shaft 194b and the valve shaft 194a, and may be provided in a structure in which the first shaft support 173 and the second shaft support 175 may be rotated to absorb a position error of the valve shaft 194a. However, a structure for limiting rotation ranges of the first shaft support 173 and the second shaft support 175, a posture change range of the first shaft support 173 and the second shaft support 175, to be within a necessary range according to characteristics of a product in which the joint 170 is installed may be necessary.

Referring to FIG. 11 to FIG. 14, the posture change range of the first shaft support 173 may be determined by a size of the through-hole 171c. The first shaft support 173 may be rotated only within a range in which interference may not occur between the shaft fixing portion 173b and the inner peripheral surface of the side plate 171b, and further rotation of the first shaft support 173 may be limited from a point at which interference may occur between the shaft fixing portion 173b and the inner peripheral surface of the side plate 171b. Therefore, the posture change range of the first shaft support 173 may be determined by the size of the through-hole 171c that determines the size of a path for the shaft fixing portion 173b to pass through the side plate 171b.

In other words, rotation of the first shaft support 173 or posture change of the first shaft support 173, may be limited to a range between a point at which interference between the inner peripheral surface of the side plate 171b and the shaft fixing portion 173b occurs when the first shaft support 173 is rotated in one direction and a point at which interference between the inner peripheral surface of the side plate 171b and the shaft fixing portion 173b occurs when the first shaft support 173 is rotated in the other direction.

The size of the through-hole 171c may be determined so that an inner diameter of the side plate 171b at which the through-hole 171c is formed may be larger than an outer diameter of the shaft fixing portion 173b and may be smaller than an inner diameter of the housing 171. The size of the through-hole 171c may be properly adjusted according to the posture change range of the first shaft support 173 attempted to be set. That is, the posture change range of the first shaft support 173 may be expanded by increasing the size of the through-hole 171c to be closer to the inner diameter of the housing 171, or the posture change range of the first shaft support 173 may be reduced by reducing the size of the through-hole 171c to be closer to the outer diameter of the shaft fixing portion 173b.

Referring to FIG. 11 to FIG. 13 and FIG. 15, the second coupling shaft 176 provided in the second shaft support 175 may include a rotary shaft 176a and a stopper 176b. The rotary shaft 176a may be a portion that occupies most of the regions of the second coupling shaft 176, and may be rotatably inserted into the second slot 172b to be rotatably coupled to the housing 171. In the first coupling shaft 174, the entire first coupling shaft 174 may be formed only of a rotary shaft.

The stopper 176b may be formed to protrude to the outside of the rotary shaft 176a, and a position of the stopper 176b inside the second slot 172b may be changed according to rotation of the rotary shaft 176a. The stopper 176b may be provided in the second slot 172b to interfere with an inner wall 171d of the housing 171 formed by the second slot 172b at a predetermined position.

The second slot 172b may be formed with a width corresponding to an outer diameter of the rotary shaft 176a. By the second slot 172b being formed such that the width of the second slot 172b may be equal to the outer diameter of the rotary shaft 176a, the second shaft support 175 and the housing 171 may be coupled so that a jolt does not occur when the second shaft support 175 is moved or rotated in the housing 171. This may also be applied to coupling between the first shaft support 173 and the housing 171.

The stopper 176b may be formed to protrude toward the inside of the second slot 172b, and the stopper 176b may protrude by a width narrower than the width of the second slot 172b. The stopper 176b may be rotated along with the second coupling shaft 176 when the second coupling shaft 176 is rotated, and when the second coupling shaft 176 is rotated by a predetermined angle or more, the stopper 176b may interfere with the inner wall 171d of the housing 171 formed by the second slot 172b, and further rotation of the second coupling shaft 176 may be limited or stopped.

Rotation of the second shaft support 175 or posture change of the second shaft support 175 may be limited to a range between a point at which interference between the inner wall 171d of the housing 171 and the stopper 176b occurs when the second shaft support 175 is rotated in one direction and a point at which interference between the inner wall of the housing and the stopper 176b occurs when the second shaft support 175 is rotated in the other direction.

As another example, instead of the stopper 176b being provided in the second coupling shaft 176, the structure for limiting the posture change range of the second shaft support 175 may also be formed identically as the structure for limiting the posture change range of the first shaft support 173. That is, the structure for limiting the posture change range of the second shaft support 175 may also have the form in which one longitudinal portion of the housing 171 in which the insertion hole 171a is formed may be covered with a side plate 171b, and the size of the through-hole 171c formed inside the side plate 171b may be adjusted to adjust the posture change range of the second shaft support 175.

However, when the structure for limiting the posture change range of the second shaft support 175 is formed as discussed, unlike the side plate 171b integrally formed with the housing 171 at the other longitudinal portion of the housing 171, the side plate at the one longitudinal portion of the housing 171 may need to be in the form of a separate cap separable from the housing 171. This is because, when the side plate at the one longitudinal portion of the housing 171 is also integrally formed with the housing 171, a path for components such as the first shaft support 173, the second shaft support 175, and the spring 177 to be inserted into the housing 171 to be assembled to the housing 171 may be blocked.

However, when the side plate at the one longitudinal portion of the housing 171 is in the form of a separate cap, the number of components for manufacturing the joint 170 may increase as a result, and the number of assembly processes may also be increased corresponding to the increased number of components. Therefore, component management becomes more difficult, and the cost and time required for manufacturing the joint 170 may also be increased.

The joint 170 may have a structure in which, instead of adding a component in the form of a separate cap, the stopper 176b for limiting rotation of the second shaft support 175 may be added in the form of a protrusion integrally formed with the rotating shaft 176a. In this way, a structure for adjusting the posture change range of the second shaft support 175 may be formed without adding a separate component. As the joint 170 may be assembled with a smaller number of components, for example, four components including the housing 171, the first shaft support 173, the second shaft support 175, and the spring 177, the components may be easily managed and assembled, and the cost and time required for manufacturing the joint 170 may be reduced.

Although it has been described that the joint 170 may be provided in the knob assembly of the cooking appliance, the embodiments are not limited thereto. The joint 170 may be used for different purposes at portions other than the knob assembly in the cooking appliance, or may be used for the purpose of transmitting a rotary of a knob or transmitting power of a drive device, such as, for example, a motor in a different type of appliance other than the cooking appliance. The joint 170 may be useful in an environment in which it is difficult for a driving shaft and a driven shaft to be connected in a line in an appliance in which a large number of components may need to be provided in a narrow inner space.

According to embodiments disclosed herein, by respectively connecting two shafts to both ends of a joint when connecting the two shafts, an angle of connection between a first shaft support and a second shaft support may be suitable for connecting the two shafts, and such a state may be maintained or changed according to circumstances by an elastic force of a spring. Therefore, a position error between the two shafts may be effectively absorbed without a separate task for adjusting the angle of connection between the first shaft support and the second shaft support and a separate task for fixing an adjusted angle of connection between the first shaft support and the second shaft support. Accordingly, two components which may be difficult to be connected by the same shaft may be effectively connected to each other. Further, a joint may be installed without a separate task for adjusting an angle of connection and a separate task for fixing the adjusted angle of connection, and the joint may be assembled using only a small number of components so that component management and assembly may be facilitated, and cost and time required in manufacturing the joint may be reduced.

Embodiments disclosed herein may provide a joint with an improved structure to effectively connect two components which may be difficult to be connected by a same shaft and to be easily and rapidly manufactured with a low cost. Embodiments disclosed herein may also provide a knob assembly and an appliance having a joint.

According to embodiments disclosed herein, a joint may include a housing formed in a cylindrical shape having a predetermined length and having a hollow formed therein and having an insertion hole formed at one longitudinal side to allow the hollow to be open to an outside of the housing, a first shaft support inserted into the housing through the insertion hole, a second shaft support inserted into the housing through the insertion hole and provided between the insertion hole and the first shaft support, and a coupling shaft provided at each of the first shaft support and the second shaft to rotatably couple the first shaft support or the second shaft support to the housing. A slot having a predetermined width extending in a circumferential direction of the housing and a predetermined length extending in a longitudinal direction of the housing may be formed in the housing, the coupling shaft provided in the second support may include a rotating shaft rotatably inserted into the slot and rotatably coupled to the housing, and a stopper formed to protrude from an outside of the rotating shaft and whose position inside the slot may be changed according to rotation of the rotating shaft, and the stopper may be provided in the slot so that the stopper may interfere with an inner wall of the housing formed by the slot at a predetermined position.

The slot may include a pair of first slots formed to respectively pass through side surfaces of the housing, provided to face each other when viewed from one longitudinal side or the other longitudinal side of the housing, and having the pair of coupling shafts provided at the first shaft support rotatably inserted thereinto, and a pair of second slots formed to respectively pass through the side surfaces of the housing, provided to face each other at different positions from the first slots when viewed from one longitudinal side or the other longitudinal side of the housing, and having the pair of coupling shafts provided at the second shaft support rotatably inserted thereinto.

The second slots may be formed with a width corresponding to an outer diameter of the rotating shaft, and the stopper may be formed to protrude in a width narrower than that of the second slots. At least one of the first shaft support and the second shaft support may include a support main body inserted into the housing and coupled to the housing by the pair of coupling shafts arranged in a line to integrally be moved and rotated with the coupling shafts, and a shaft fixing portion extending in the longitudinal direction of the housing from the support main body to protrude to the outside of the housing.

A side plate configured to block the other longitudinal side of the housing may be provided at the other longitudinal side of the housing, a through-hole through which the shaft fixing portion passes may be formed inside the side plate, and an inner diameter of the side plate having the through-hole formed therein may be larger than the outer diameter of the shaft fixing portion and smaller than the inner diameter of the housing.

Rotation of the first shaft support may be limited to a range between a point at which interference occurs between an inner peripheral surface of the side plate and the shaft fixing portion when the first shaft support is rotated in one direction and a point at which interference occurs between the inner peripheral surface of the side plate and the shaft fixing portion when the first shaft support is rotated in the other direction.

The joint may further include an spring provided between the first shaft support and the second shaft support and configured to provide an elastic force for returning positions of the first shaft support and the second shaft support changed due to movement of the coupling shaft and postures of the first shaft support and the second shaft support changed due to rotation of the coupling shaft to original states. The spring may include a coil spring having one longitudinal side coupled to the first shaft support and the other longitudinal side coupled to the second shaft support, and provided to be elastically stretched in a longitudinal direction and to be elastically bent in a rotating direction of the first shaft support or the second shaft support.

A fitting groove to which the one longitudinal side of the spring may be fitted and coupled and a fitting groove to which the other longitudinal side of the spring may be fitted and coupled may be respectively formed at surfaces of the first shaft support and the second shaft support facing each other. Rotation of the second shaft support may be limited to a range between a point at which interference occurs between an inner wall of the housing and the stopper when the second shaft support is rotated in one direction and a point at which interference occurs between the inner wall of the housing and the stopper when the second shaft support is rotated in the other direction.

According to embodiments disclosed herein, a knob assembly may include a valve assembly having a valve shaft, a knob for operating the valve shaft, a knob shaft connected to the knob, and a joint. The joint may include one of a first shaft support and a second shaft support connected to the valve shaft and the other one of the first shaft support and the second shaft support connected to the knob shaft to connect the knob shaft and the valve shaft to each other.

According to embodiments disclosed herein, an appliance may includes a knob assembly including a valve assembly having a valve shaft, a knob for operating the valve shaft, a knob shaft connected to the knob, and a joint. The joint may include one of a first shaft support and a second shaft support connected to the valve shaft and the other one of the first shaft support and the second shaft support connected to the knob shaft to connect the knob shaft and the valve shaft to each other.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

This application relates to U.S. application Ser. Nos. 15/899,507; 15/899,583; 15/899,730; and 15/899,797; all filed on Feb. 20, 2018, which are hereby incorporated by reference in their entirety. Further, one of ordinary skill in the art will recognize that features disclosed in these above-noted applications may be combined in any combination with features disclosed herein.

What is claimed is:

1. A joint for a shaft including a first shaft and a second shaft, comprising:
   a rotational movement transmitting member provided between the first shaft and the second shaft;
   a first shaft support provided on the rotational movement transmitting member, configured to be connected to the first shaft, and rotatable relative to the rotational movement transmitting member with respect to a first rotational center intersecting an axial direction of the first shaft;
   a second shaft support provided on the rotational movement transmitting member, configured to be connected to the second shaft, and rotatable relative to the rotational movement transmitting member with respect to a second rotational center intersecting an axial direction of the second shaft and not parallel to the first rotational center; and
   an elastic member that elastically supports the first shaft support and the second shaft support such that the first shaft support and the second shaft support are separated from each other in a longitudinal direction of the shaft, wherein at least one of the first shaft support or the second shaft support is slidable with respect to the rotational movement transmitting member so as to change a distance between the first shaft support and the second shaft support in the longitudinal direction of the shaft, and wherein the at least one of the first shaft support or the second shaft support is slid away from the other of the at least one first shaft support or the second shaft support by the elastic member.

2. The joint of claim 1, wherein axial movement of one of the first shaft support or the second shaft support is transmitted to the other of the first shaft support or the second shaft support, as the at least one of the first shaft support or the second shaft support slides with respect to the rotational movement transmitting member so that the first shaft support and the second shaft support approach each other.

3. The joint of claim 2, wherein the axial movement of the one of the first shaft support or the second shaft support is transmitted to the other of the first shaft support or the second shaft support, as the one of the first shaft support or the second shaft support pushes the other of the first shaft support or the second shaft support directly.

4. The joint of claim 1, wherein the rotational movement transmitting member includes a hollow that extends in the longitudinal direction of the shaft, and at least one of the first shaft support or the second shaft support is slidable along a longitudinal direction of the hollow.

5. The joint of claim 4, wherein the rotational movement transmitting member includes an insertion hole that provides an opening for the hollow to outside of the rotational movement transmitting member on a first longitudinal side of rotational movement transmitting member, wherein the second shaft support is inserted into the hollow through the insertion hole, and is disposed closer to the insertion hole than the first shaft support, and wherein the second shaft support is slidable in the longitudinal direction of the hollow.

6. The joint of claim 5, wherein the first shaft support is inserted into the hollow through the insertion hole, and wherein the first shaft support is slidable in the longitudinal direction of the hollow.

7. The joint of claim 6, wherein a side plate configured to block a second longitudinal side of the rotational movement transmitting member is provided at the second longitudinal side of the rotational movement transmitting member, wherein a through-hole through which a shaft connecting portion of the first shaft support passes is formed inside of the side plate, and wherein an inner diameter of the side plate having the through-hole formed therein is larger than an outer diameter of the shaft connecting portion and smaller than an inner diameter of the rotating movement transmitting member.

8. The joint of claim 7, wherein pivoting of the first shaft support is limited to a range between a point at which interference occurs between an inner peripheral surface of the side plate and the shaft connecting portion when the first shaft support is pivoted in a first direction and a point at which interference occurs between the inner peripheral surface of the side plate and the shaft fixing portion when the first shaft support is pivoted in a second direction.

9. The joint of claim 1, further comprising at least one first coupling shaft and at least one second coupling shaft provided on the first shaft support and the second shaft support, respectively, wherein the at least one first coupling shaft and the at least one second coupling shaft rotatably couple the first shaft support and the second shaft support to the rotational movement transmitting member respectively, and wherein the at least one first coupling shaft and the at least one second coupling shaft form the first rotational center and the second rotational center, respectively.

10. The joint of claim 9, wherein the rotational movement transmitting member includes at least one first slot and at least one second slot, which extend in the longitudinal direction, and wherein the at least one first coupling shaft and the at least one second coupling shaft are inserted into the at least one first slot and the at least one second slot, respectively.

11. The joint of claim 10, wherein the at least one second coupling shaft includes a body, and a stopper that protrudes from the body, wherein the body has a width corresponding to a width of the at least one second slot such that the body is inserted into the at least one second slot and rotatably coupled to the rotational movement transmitting member, and wherein the stopper has a width smaller than the width of the at least one second slot such that the stopper interferes with an inner wall of the at least one second slot to limit a rotational range of the body.

12. The joint of claim 11, wherein the body has a round shape and the stopper protrudes radially from the body.

13. The joint of claim 11, wherein pivoting of the second shaft support is limited to a range between a point at which interference occurs between an inner wall of the at least one second slot and the stopper when the second shaft support is pivoted in a first direction and a point at which interference occurs between the inner wall of the at least one second slot and the stopper when the second shaft support is pivoted in a second direction.

14. The joint of claim 10, wherein the at least one first slot comprises a pair of the first slots formed through side surfaces of the rotational movement transmitting member to face each other when viewed from a first longitudinal side or a second longitudinal side of the rotational movement transmitting member, wherein the at least one first coupling shaft comprises a pair of first coupling shafts rotatably inserted into the pair of first slots, wherein the at least one second slot comprises a pair of second slots formed through the side surfaces of the rotational movement transmitting member to face each other at different positions from the pair of first slots when viewed from the first longitudinal side or the second longitudinal side of the rotational movement transmitting member, and wherein the at least one second coupling shaft comprises a pair of second coupling shafts rotatably inserted into the pair of second slots.

15. The joint of claim 9, wherein at least one of the first shaft support or the second shaft support includes:
   a support main body inserted into the rotational movement transmitting member and coupled to the rotational movement transmitting member by the at least one first coupling shaft or the at least one second coupling shaft, wherein the support main body is moved and rotated with the at least one first coupling shaft or the at least one second coupling shaft; and
   a shaft connecting portion that extends in the longitudinal direction of the shaft from the support main body and connected to the first shaft or the second shaft.

16. The joint of claim 15, wherein the shaft connecting portion is detachably connected to the first shaft or the second shaft.

17. The joint of claim 1, wherein the elastic member is provided between the first shaft support and the second shaft support and configured to provide an elastic force to restore positions of the first shaft support and the second shaft support.

18. The joint of claim 17, wherein the elastic member is a coil spring having a first longitudinal side coupled to the first shaft support and a second longitudinal side coupled to the second shaft support, and configured to be elastically stretched in the longitudinal direction and to be elastically bent in a pivoting direction of the first shaft support or the second shaft support.

19. The joint of claim 18, wherein a first fitting groove to which the first longitudinal side of the spring is fitted and coupled and a second fitting groove to which the second longitudinal side of the spring is fitted and coupled are respectively formed at surfaces of the first shaft support and the second shaft support facing each other.

20. A joint for a shaft including a first shaft and a second shaft, comprising:
   a housing provided between the first shaft and the second shaft;
   a first shaft support provided on the housing, configured to be connected to the first shaft, and rotatable relative to the housing with respect to a first rotational center intersecting an axial direction of the first shaft;
   a second shaft support provided on the housing, configured to be connected to the second shaft, and rotatable relative to the housing with respect to a second rotational center intersecting an axial direction of the second shaft and not parallel to the first rotational center; and
   a spring that elastically pushes the first shaft support and the second shaft support away from each other in a longitudinal direction of the shaft, wherein at least one of the first shaft support or the second shaft support is slidable with respect to the housing so as to change a distance between the first shaft support and the second shaft support in the longitudinal direction of the shaft, and wherein the at least one of the first shaft support or the second shaft support is slid away from the other of the first shaft support or the second shaft support by the spring.

* * * * *